(12) United States Patent
Honda et al.

(10) Patent No.: US 12,125,971 B2
(45) Date of Patent: Oct. 22, 2024

(54) BATTERY AND LAMINATED BATTERY

(71) Applicant: Panasonic Intellectual Property Management Co., Ltd., Osaka (JP)

(72) Inventors: Kazuyoshi Honda, Osaka (JP); Yasutaka Tsutsui, Osaka (JP); Tsutomu Koshizuka, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 724 days.

(21) Appl. No.: 17/337,492

(22) Filed: Jun. 3, 2021

(65) Prior Publication Data

US 2021/0288347 A1     Sep. 16, 2021

Related U.S. Application Data

(63) Continuation of application No. PCT/JP2019/030685, filed on Aug. 5, 2019.

(30) Foreign Application Priority Data

Dec. 27, 2018    (JP) ................................ 2018-246127

(51) Int. Cl.
     *H01M 10/0562*      (2010.01)
     *H01M 4/131*      (2010.01)
     (Continued)

(52) U.S. Cl.
     CPC ....... *H01M 10/0562* (2013.01); *H01M 4/131* (2013.01); *H01M 4/66* (2013.01);
     (Continued)

(58) Field of Classification Search
     CPC .......... H01M 10/0562; H01M 50/186; H01M 50/195; H01M 50/198; H01M 50/184;
     (Continued)

(56) References Cited

U.S. PATENT DOCUMENTS

| | | | | |
|---|---|---|---|---|
| 5,654,111 A | * | 8/1997 | Minomiya | .......... H01M 10/425 429/162 |
| 2009/0042099 A1 | | 2/2009 | Tatematsu et al. | |

(Continued)

FOREIGN PATENT DOCUMENTS

| JP | 6-052866 | | 2/1994 |
|---|---|---|---|
| JP | 652866 | * | 2/1994 |

(Continued)

OTHER PUBLICATIONS

JP2003092092 Claims MT (Year: 2003).*

(Continued)

*Primary Examiner* — Alexander Usyatinsky
(74) *Attorney, Agent, or Firm* — Rimon P.C.

(57) ABSTRACT

A battery includes: a positive electrode current collector, a positive electrode active material layer, a solid electrolyte layer containing a solid electrolyte, a negative electrode active material layer, and a negative electrode current collector that are laminated in this order; and a sealing member. The battery has an opening hole penetrating the positive electrode current collector, the positive electrode active material layer, the solid electrolyte layer containing the solid electrolyte, the negative electrode active material layer, and the negative electrode current collector in a laminating direction and further includes a sealing member. In cross-sectional view perpendicular to the laminating direction, the sealing member is located between the opening hole and each of the positive electrode active material layer, the solid electrolyte layer, and the negative electrode active material layer.

18 Claims, 14 Drawing Sheets

(51) Int. Cl.
  *H01M 4/66* (2006.01)
  *H01M 10/0565* (2010.01)
  *H01M 10/0585* (2010.01)
  *H01M 50/184* (2021.01)
  *H01M 50/186* (2021.01)
  *H01M 50/191* (2021.01)
  *H01M 50/193* (2021.01)
  *H01M 50/195* (2021.01)
  *H01M 50/198* (2021.01)

(52) U.S. Cl.
  CPC ... *H01M 10/0565* (2013.01); *H01M 10/0585* (2013.01); *H01M 50/184* (2021.01); *H01M 50/186* (2021.01); *H01M 50/191* (2021.01); *H01M 50/193* (2021.01); *H01M 50/195* (2021.01); *H01M 50/198* (2021.01); *H01M 2300/0065* (2013.01)

(58) Field of Classification Search
  CPC .. H01M 50/193; H01M 50/191; H01M 4/131; H01M 4/66; H01M 10/0565; H01M 10/0585; H01M 2300/0065
  See application file for complete search history.

(56) References Cited

U.S. PATENT DOCUMENTS

2017/0309964 A1* 10/2017 Iwamoto ........... H01M 10/0565
2018/0205119 A1*  7/2018 Kodama ............... H01M 4/386

FOREIGN PATENT DOCUMENTS

| JP | 8-017411 | | 1/1996 |
| JP | 2003092092 | * | 3/2003 |
| JP | 2005-056761 | | 3/2005 |
| JP | 2007-207510 | | 8/2007 |
| JP | 2015076178 | * | 4/2015 |
| JP | 2017-199668 | | 11/2017 |
| JP | 2018-116812 | | 7/2018 |

OTHER PUBLICATIONS

The Decision of SIPO to grant a Patent for Application CN 201980067219 (Year: 2023).*
The decision of JPO to grant a Patent for Application No. 2020-562331 (Year: 2023).*
International Search Report of PCT application No. PCT/JP2019/030685 dated Nov. 5, 2019.

* cited by examiner

BATTERY AND LAMINATED BATTERY

BACKGROUND

1. Technical Field

The present disclosure relates to a battery and to a laminated battery.

2. Description of the Related Art

Japanese Unexamined Patent Application Publication No. 2005-56761 discloses a sheet-shaped battery including a penetrating opening and a penetrating electrode.

SUMMARY

In the conventional technology, further improvement in the reliability and mountability has been desired.

One non-limiting and exemplary embodiment provides a battery with further improved reliability and mountability.

In one general aspect, the techniques disclosed here feature a battery including: a positive electrode current collector; a positive electrode active material layer; a solid electrolyte layer containing a solid electrolyte; a negative electrode active material layer; and a negative electrode current collector. The battery has a structure in which the positive electrode current collector, the positive electrode active material layer, the solid electrolyte layer, the negative electrode active material layer, and the negative electrode current collector are laminated in this order. The battery has an opening hole penetrating the positive electrode current collector, the positive electrode active material layer, the solid electrolyte layer, the negative electrode active material layer, and the negative electrode current collector in a laminating direction of the structure and further includes a sealing member. The negative electrode active material layer and the solid electrolyte layer have respective laminating surfaces intersecting the laminating direction. In cross-sectional view perpendicular to the laminating direction, the sealing member is located between the opening hole and each of the positive electrode active material layer, the solid electrolyte layer, and the negative electrode active material layer. The sealing member is in contact with the positive electrode current collector and the negative electrode current collector and is in contact with a part of the laminating surface of the negative electrode active material layer or a part of the laminating surface of the solid electrolyte layer.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
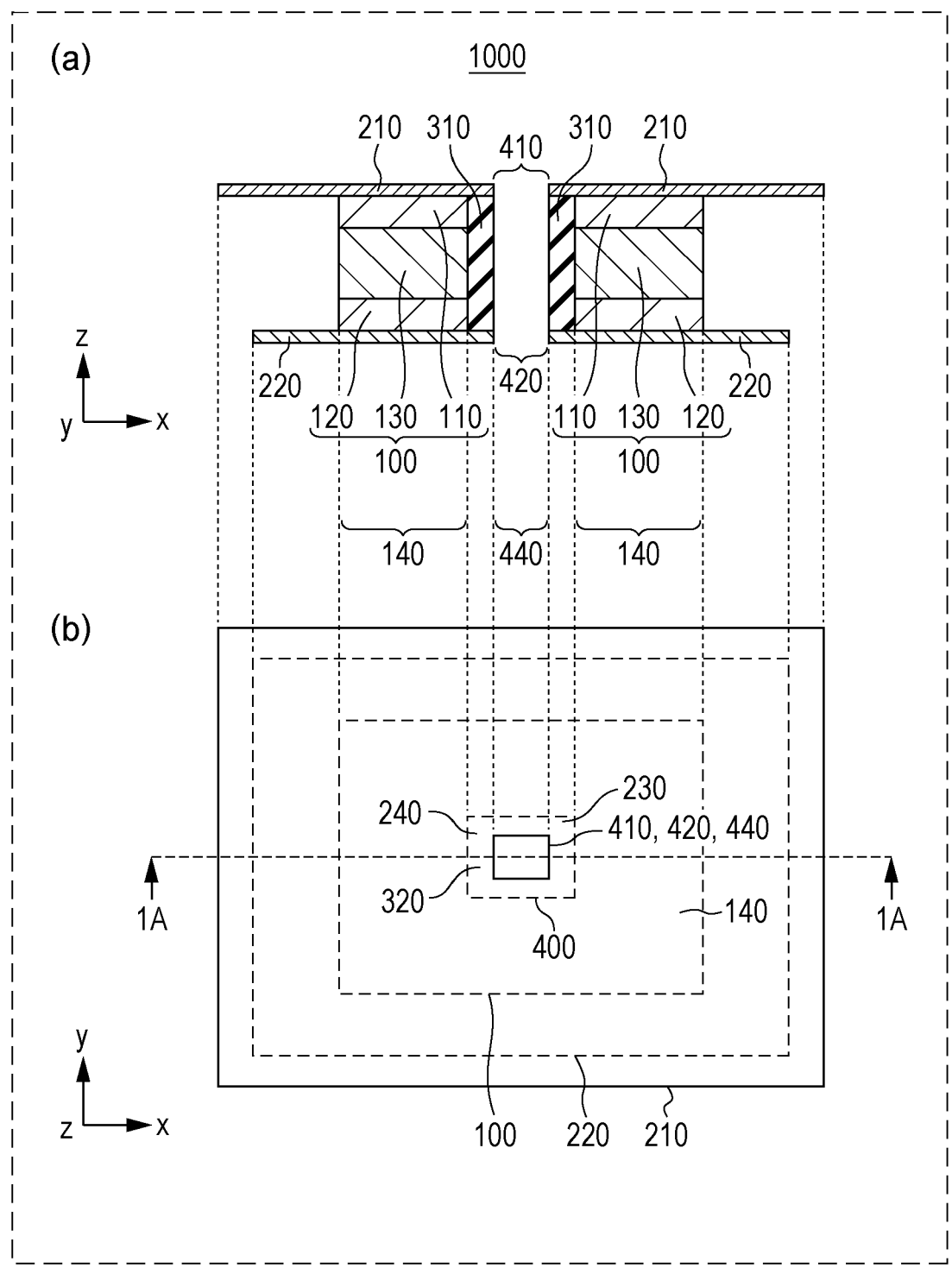
FIG. 1 shows illustrations of an example of a schematic structure of a battery in embodiment 1.

DETAILED DESCRIPTION (Overview of the Present Disclosure)

A battery in one aspect of the present disclosure includes: a positive electrode current collector; a positive electrode active material layer; a solid electrolyte layer containing a solid electrolyte; a negative electrode active material layer; and a negative electrode current collector. The battery has a structure in which the positive electrode current collector, the positive electrode active material layer, the solid electrolyte layer, the negative electrode active material layer, and the negative electrode current collector are laminated in this order. The battery has an opening hole penetrating the positive electrode current collector, the positive electrode active material layer, the solid electrolyte layer, the negative electrode active material layer, and the negative electrode current collector in a laminating direction of the structure and further includes a sealing member. In cross-sectional view perpendicular to the laminating direction, the sealing member is located between the opening hole and the positive electrode active material layer, between the opening hole and the solid electrolyte layer, and between the opening hole and the negative electrode active material layer. The negative electrode active material layer and the solid electrolyte layer may have respective laminating surfaces intersecting the laminating direction. The sealing member may be in contact with the positive electrode current collector and the negative electrode current collector and may be in contact with a part of the laminating surface of the negative electrode active material layer or a part of the laminating surface of the solid electrolyte layer.

In this battery, the sealing member is formed between the opening hole and the positive electrode active material layer, between the opening hole and the solid electrolyte layer, and between the opening hole and the negative electrode active material layer. To mount the battery, a space is required in some cases because a cable etc. must be disposed, visual checking must be performed, or cooling must be performed. Even in these cases, since the battery has the opening hole, it is unnecessary to provide a space in the thickness direction of the battery, e.g., a space between the battery and another battery or a space between the battery and a housing case, and therefore, an increase in the volume necessary for mounting the battery can be prevented. The sealing member is formed between the opening hole and a power generation element including the positive electrode active material layer, the solid electrolyte layer, and the negative electrode active material layer. Therefore, even when, for example, a shock is applied to the battery, collapse of the power generation element can be prevented. The reliability and mountability of the battery can thereby be improved.

For example, the positive electrode active material layer, the solid electrolyte layer, and the negative electrode active material layer may not be exposed in the opening hole.

In this case, when an electronic component, an optical component, a cable, etc. is inserted into the opening hole, since the power generation element including the positive electrode active material layer, the solid electrolyte layer, and the negative electrode active material layer is not exposed in the opening hole, collapse of the power generation element due to a physical shock can be prevented. Therefore, the reliability of the battery can be improved.

For example, the sealing member may be sandwiched between the positive electrode current collector and the negative electrode current collector.

In this case, the sealing member is disposed between the negative electrode current collector and the positive electrode current collector. Therefore, the positive and negative electrodes of the power generation element are unlikely to come in to contact with each other, so that a short circuit can be prevented. Moreover, since the sealing member that does not contribute to power generation is prevented from protruding from the power generation element beyond the thickness range thereof, the amount of a useless space when the battery is mounted can be reduced. The reliability and mountability of the battery can thereby be improved.

For example, the sealing member may have a shape protruding into the solid electrolyte layer.

In this case, the solid electrolyte layer is supported by the protruding portion of the sealing member, so that, even when an external force is applied to the opening hole, collapse of the solid electrolyte layer can be prevented. Therefore, the risk of breakage of the power generation element can be reduced, and the reliability of the battery can be improved.

For example, the sealing member may have a shape protruding toward the opening hole.

In this case, the sealing member protrudes inward beyond at least one of an opening on the negative electrode current collector side or an opening on the positive electrode current collector side. Therefore, even when another member or another component is inserted through any of the opening holes, an external force is prevented from acting directly on the negative electrode current collector or the positive electrode current collector, and the influence of the external force on the power generation element can be reduced. Delamination of the negative electrode current collector, delamination of the positive electrode current collector, and collapse of the power generation element can thereby be prevented. In this case, the mechanical strength of the battery can be improved, and the reliability of the battery can be improved.

For example, the battery may have a space inside the sealing member or between the sealing member and at least one of the positive electrode active material layer, the solid electrolyte layer, or the negative electrode active material layer.

In this case, the sealing member has the space. Therefore, even when an external force is applied to the opening hole to cause the sealing member to deform, the space inside the sealing member or between the sealing member and the power generation element mitigates the shock, and the power generation element is prevented from receiving a mechanical shock. Therefore, collapse of the power generation element due to a mechanical shock such as an external force can be prevented, and the mechanical strength of the battery can be improved. When the power generation element is in contact with the space, even if gas is generated from the power generation element, for example, during charging or discharging, the pressure of the gas is relaxed by the space, and progress of delamination in the power generation element due to the gas generated can be prevented. Therefore, the reliability of the battery can be improved.

For example, an opening hole-side side surface of at least one of the positive electrode active material layer or the negative electrode active material layer may be covered with the solid electrolyte layer and may not be in contact with the sealing member.

In this case, the opening hole-side side surface of the at least one of the positive electrode active material layer or the negative electrode active material layer is covered with the solid electrolyte layer. Therefore, collapse of the opening hole-side side surface of the at least one of the positive electrode active material layer or the negative electrode active material layer is prevented, and the capacity of the battery can be maintained. Moreover, the reliability of the battery can be improved.

For example, in plan view, the part of the laminating surface of the negative electrode active material layer may be located closer to the opening hole than the solid electrolyte layer, and the sealing member may be in contact with the part of the laminating surface of the negative electrode active material layer.

In this case, an opening hole-side side surface of the solid electrolyte layer is formed on the surface of the negative electrode active material layer that faces the positive electrode current collector. Therefore, the sealing member is formed on the surface of the negative electrode active material layer that is not covered with the solid electrolyte layer and faces the positive electrode current collector, and this surface is firmly held directly by the sealing member. Collapse of the power generation element is thereby prevented, and the reliability of the battery can be improved.

For example, the solid electrolyte layer may include a first solid electrolyte layer having the laminating surface and a second solid electrolyte layer that is located closer to the positive electrode active material layer than the first solid electrolyte layer. In plan view, the part of the laminating surface of the first solid electrolyte layer may be located closer to the opening hole than the second solid electrolyte layer, and the sealing member may be in contact with the part of the laminating surface of the first solid electrolyte layer.

In this case, an opening hole-side side surface of the second solid electrolyte layer is formed on the surface of the first solid electrolyte layer. Therefore, the sealing member is formed on the surface of the first solid electrolyte layer that faces the positive electrode current collector, and a side surface of the first solid electrolyte layer is reliably covered with the sealing member. Moreover, the portion of the first solid electrolyte layer that does not face the second solid electrolyte layer can be held by the sealing member, so that the first solid electrolyte layer can be prevented from coming off. Therefore, the reliability of the battery can be improved.

For example, the sealing member may include a first sealing member containing a first material and a second sealing member located closer to the positive electrode current collector than the first sealing member and containing a second material different from the first material.

In this case, encapsulating materials optimal for the sealing members on the positive and negative electrode sides can be selected in terms of reactivity, mechanical properties, etc. Therefore, the reliability of the battery can be improved.

For example, the sealing member may contain an insulating material having no ionic conductivity.

In this case, since the material of the sealing member is the insulating material, the continuity between the negative electrode current collector and the positive electrode current collector can be prevented. Moreover, since the material of the sealing member has no ionic conductivity, a reduction in the battery characteristics due to, for example, contact between the encapsulating material and another battery member can be prevented. Therefore, the reliability of the battery can be further improved.

For example, the sealing member may contain a resin or a sealing material.

In this case, since the sealing member contains the resin or the sealing material, even when an external force is applied to the battery or the battery is exposed to a humid atmosphere or a gas component, the flexibility, pliability, and gas barrier properties of the sealing member prevent adverse effects on the power generation element. Therefore, the reliability of the battery can be improved.

For example, the sealing member may contain at least one selected from the group consisting of thermosetting or photocurable epoxy resins, thermosetting or photocurable acrylic resins, thermosetting or photocurable polyimide resins, and thermosetting or photocurable silsesquioxanes.

The epoxy resins, the acrylic resins, the polyimide resins, and the silsesquioxanes are materials that have flowability in their initial state and can be cured by subjecting the materials to UV irradiation or heat treatment to cause the materials to lose their flowability. Therefore, the sealing member can be formed using any of these easily curable materials. If necessary, preliminary curing using heat treatment or UV irradiation may be performed, and then final curing may be performed using heat treatment or UV irradiation. In this manner, the deformation of the sealing member in each production step can be prevented.

For example, the sealing member may contain a particulate metal oxide material.

In this case, for example, the characteristics of the sealing member such as the ability to retain the shape of the battery, insulating properties, heat conductivity, and moisture resistance can be further improved.

For example, the battery may have a plurality of opening holes, and the opening hole may be one of the plurality of opening holes.

In this case, the battery can be used even when it is mounted to an object having a complicated shape.

A laminated battery in another aspect of the present disclosure includes a plurality of batteries, and each of the plurality of batteries is the above battery. The plurality of batteries are electrically connected in series or parallel and are laminated such that the opening holes of the plurality of batteries are in communication with each other.

In the laminated battery formed as described above, the laminating positions of the opening holes of the batteries with improved reliability are aligned with each other such that the opening holes are in communication with each other. Therefore, in this laminated battery, as in the above single battery, the opening holes can be utilized. The reliability and mountability of the laminated battery can thereby be improved.

The laminated battery may further include a coating member that covers an inner surface of a communicating opening hole formed of the opening holes of the batteries that are in communication with each other.

In this case, the coating member is disposed around the opening holes of the batteries and extends between the positive and negative electrode current collectors of each battery. Therefore, the coating member, together with the structure having the effect of increasing the joint strength between the positive and negative electrode current collectors in each opening hole and the effect of preventing a short circuit therebetween, allows the laminating state of the plurality of batteries in the laminated battery to be more firmly maintained.

Embodiments of the present disclosure will next be described with reference to the drawings.

The embodiments described below show general or specific examples. Numerical values, shapes, materials, components, arrangements and connections of the components, steps, the order of the steps, etc. shown in the following embodiments are merely examples and are not intended to limit the present disclosure. Among the components in the following embodiments, components not described in an independent claim will be described as optional components.

The drawings are schematic drawings and are not necessarily strictly accurate illustrations. Therefore, the scales etc. in the drawings do not always agree with each other. In the drawings, the same reference numerals are given to substantially the same components, and redundant description thereof will be omitted or simplified.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

In the present specification and the drawings, x, y, and z axes are the three axes of a three-dimensional orthogonal coordinate system. In each embodiment, the z axis direction is the direction of the thickness of the battery. In the present specification, "the thickness direction" is a direction perpendicular to the laminating surfaces of the layers.

In the present specification, the phrase "in plan view" means that the battery is viewed in its laminating direction. In the present specification, "the thicknesses" of the battery and each layer are their lengths in the laminating direction. In the present specification, "the laminating surface" is a surface of the battery when the battery is viewed in the laminating direction. Specifically, "the laminating surface" is a surface intersecting the laminating direction. For example, the laminating surface is a surface substantially perpendicular to the laminating direction. In the present specification, "the side surfaces" are surfaces of the battery when the battery is viewed in a direction perpendicular to the laminating direction of the battery. Specifically, "the side surfaces" are surfaces intersecting a direction perpendicular to the laminating direction. For example, the side surfaces are surfaces substantially parallel to the laminating direction.

In the present specification, the terms "outside," "outward," "outer," "inside," "inward," and "inner" are those when the battery is viewed in the laminating direction of the battery.

In the present specification, the terms "above" and "below" in the structure of the battery do not refer to an upward direction (vertically above) and a downward direction (vertically below), respectively, in space recognition in an absolute manner but are used to define relative positional relations based on the laminating order in the laminated structure. The terms "above" and "below" are used not only when two components are disposed with a space therebetween and another component is present between the two components but also when two components are disposed in contact with each other.

Embodiment 1

[Structure]

FIG. 1 shows illustrations of a schematic structure of a battery 1000 in embodiment 1. Specifically, FIG. 1(a) is a cross-sectional view showing the schematic structure of the battery 1000 and shows a cross section taken along line 1A-1A in FIG. 1(b). FIG. 1(b) is a transparent top view showing the schematic structure of the battery 1000. In FIG. 1(b), the shapes of components of the battery 1000 in plan view when the battery 1000 is viewed from above are represented by solid or broken lines.

As shown in FIG. 1, the battery 1000 in embodiment 1 has a structure in which a positive electrode current collector 220, a positive electrode active material layer 120, a solid electrolyte layer 130 containing a solid electrolyte, a negative electrode active material layer 110, and a negative electrode current collector 210 are laminated in this order. The battery 1000 has an opening hole 440 penetrating the positive electrode current collector 220, the positive electrode active material layer 120, the solid electrolyte layer 130 containing the solid electrolyte, the negative electrode active material layer 110, and the negative electrode current collector 210 in the laminating direction and further includes a sealing member 310. In cross-sectional view perpendicular to the laminating direction, the sealing member 310 is located between the opening hole 440 and the positive electrode active material layer 120, between the opening hole 440 and the solid electrolyte layer 130, and between the opening hole 440 and the negative electrode active material layer 110. In the present disclosure, "in cross-sectional view perpendicular to the laminating direction" is the case where a cross section parallel to the laminating direction is viewed in a direction perpendicular to the laminating direction, as in FIG. 1(a).

The battery 1000 includes a power generation element 100, the negative electrode current collector 210, the positive electrode current collector 220, and the sealing member 310. The battery 1000 in embodiment 1 has a battery opening 400 located inside the power generation element 100, and side surfaces of the power generation element 100 that are in contact with the battery opening 400 are covered with the sealing member 310. The battery opening 400 includes the sealing member 310 and the opening hole 440 surrounded by the sealing member 310.

The power generation element 100 is, for example, a power generator having a charging/discharging function. The power generation element 100 is, for example, a secondary battery. For example, the power generation element 100 is a single battery (i.e. a cell). The power generation element 100 is disposed between the negative electrode current collector 210 and the positive electrode current collector 220.

As shown in FIG. 1(a), the power generation element 100 includes the negative electrode active material layer 110 and the positive electrode active material layer 120. The power generation element 100 further includes the solid electrolyte layer 130. The negative electrode active material layer 110, the solid electrolyte layer 130, and the positive electrode active material layer 120 are laminated in this order from the negative electrode current collector 210 side in the thickness direction of the battery 1000 (the z axis direction).

The negative electrode active material layer 110 contains, for example, a negative electrode active material as an electrode material. The negative electrode active material layer 110 is disposed so as to face the positive electrode active material layer 120.

A negative electrode active material such as graphite or metallic lithium can be used as the negative electrode active material contained in the negative electrode active material layer 110. The negative electrode active material used may be any of various materials that can occlude and release ions such as lithium (Li) ions or magnesium (Mg) ions.

A solid electrolyte such as an inorganic solid electrolyte may be used as a component material of the negative electrode active material layer 110. For example, a sulfide solid electrolyte or an oxide solid electrolyte may be used as the inorganic solid electrolyte, but this is not a limitation. For example, a mixture of lithium sulfide ($Li_2S$) and diphosphorus pentasulfide ($P_2S_5$) may be used as the sulfide solid electrolyte. A conductive material such as acetylene black, Ketjen black, carbon black, graphite, or carbon fibers and a binder such as polyvinylidene fluoride may be used as component materials of the negative electrode active material layer 110. Other examples of the binder include: synthetic rubbers such as butadiene rubber, isoprene rubber, styrene-butadiene rubber (SBR), styrene-butadiene-styrene (SBS) copolymers, styrene-ethylene-butadiene-styrene (SEBS) copolymers, ethylene-propylene rubber, butyl rubber, chloroprene rubber, acrylonitrile-butadiene rubber, acrylic rubber, silicone rubber, fluorocarbon rubber, and urethane rubber; polyvinylidene fluoride-hexafluoropropylene (PVDF-HFP) copolymers; polyimides; polyamides; polyimide-imides; polyvinyl alcohols; and chlorinated polyethylenes (CPE).

The negative electrode active material layer 110 may be produced, for example, by kneading the component materials of the negative electrode active material layer 110 with a solvent to prepare a paste-like coating material, applying the coating material to the surface of the negative electrode current collector 210, and drying the coating material. To increase the density of the negative electrode active material layer 110, a negative electrode plate including the negative electrode active material layer 110 and the negative electrode current collector 210 may be pressed after drying. The thickness of the negative electrode active material layer 110 is, for example, equal to or more than 5 µm and equal to or less than 300 µm but is not limited thereto.

The positive electrode active material layer 120 is a layer containing a positive electrode material such as an active material. The positive electrode material is a material forming a counter electrode of the negative electrode material. The positive electrode active material layer 120 contains, for example, a positive electrode active material.

A positive electrode active material such as lithium cobaltate complex oxide (LCO), lithium nickelate complex oxide (LNO), lithium manganate complex oxide (LMO), lithium-manganese-nickel complex oxide (LMNO), lithium-manganese-cobalt complex oxide (LMCO), lithium-nickel-cobalt complex oxide (LNCO), or lithium-nickel-manganese-cobalt complex oxide (LNMCO) can be used as the positive electrode active material contained in the positive electrode active material layer 120.

The positive electrode active material used may be any of various materials that can occlude and release ions such as lithium ions or magnesium ions.

A solid electrolyte such as an inorganic solid electrolyte may be used as a component material of the positive electrode active material layer 120. A sulfide solid electrolyte, an oxide solid electrolyte, etc. may be used as the inorganic solid electrolyte, but this is not a limitation. For example, a mixture of lithium sulfide ($Li_2S$) and diphosphorus pentasulfide ($P_2S_5$) may be used as the sulfide solid electrolyte. The surface of the positive electrode active material may be coated with a solid electrolyte. A conductive material such as acetylene black and a binder such as polyvinylidene fluoride may be used as component materials of the positive electrode active material layer 120. Any of the above described materials used for the negative electrode active material layer 110 may be used as the conductive material and the binder.

The positive electrode active material layer 120 can be produced, for example, by kneading the component materials of the positive electrode active material layer 120 with a solvent to prepare a paste-like coating material, applying the coating material to the surface of the positive electrode current collector 220, and drying the coating material. To increase the density of the positive electrode active material layer 120, a positive electrode plate including the positive electrode active material layer 120 and the positive electrode current collector 220 may be pressed after drying. The thickness of the positive electrode active material layer 120 is, for example, equal to or more than 5 μm and equal to or less than 300 μm but is not limited thereto.

The solid electrolyte layer 130 is disposed between the negative electrode active material layer 110 and the positive electrode active material layer 120. The solid electrolyte layer 130 is in contact with the negative electrode active material layer 110 and with the positive electrode active material layer 120. The solid electrolyte layer 130 is a layer containing an electrolyte material. The electrolyte material used may be a well-known electrolyte for batteries. The thickness of the solid electrolyte layer 130 may be equal to or more than 5 μm and equal to or less than 300 μm and may be equal to or more than 5 μm and equal to or less than 100 μm.

The solid electrolyte layer 130 may contain a solid electrolyte. The battery 1000 including the power generation element 100 may be, for example, an all-solid-state battery.

The solid electrolyte used may be, for example, an inorganic solid electrolyte. The inorganic solid electrolyte used may be, for example, a sulfide solid electrolyte, an oxide solid electrolyte, or a halide solid electrolyte, but this is not a limitation. For example, a mixture of lithium sulfide ($Li_2S$) and diphosphorus pentasulfide ($P_2S_5$) may be used as the sulfide solid electrolyte. The solid electrolyte layer 130 may contain, in addition to the electrolyte material, a binder such as polyvinylidene fluoride. The binder used may be any of the above-described materials used for the negative electrode active material layer 110.

In embodiment 1, the negative electrode active material layer 110, the positive electrode active material layer 120, and the solid electrolyte layer 130 are maintained in parallel flat shapes. In this case, the occurrence of cracking or collapse due to bending can be prevented. The negative electrode active material layer 110, the positive electrode active material layer 120, and the solid electrolyte layer 130 may be smoothly bent together.

A power generation region 140 is shown in FIG. 1(b). The power generation region 140 corresponds to a portion of the power generation element 100 that contributes mainly to power generation and power storage. A negative electrode opening 410 is formed in the negative electrode current collector 210, and a positive electrode opening 420 is formed in the positive electrode current collector 220. The opening hole 440 of the battery 1000 is located inside the power generation region 140 and is a region in which the negative electrode opening 410 and the positive electrode opening 420 overlap each other in plan view. Specifically, the opening hole 440 is a through hole extending from the negative electrode opening 410 to the positive electrode opening 420. The opening hole 440 passes through the battery 1000 in plan view.

The power generation region 140 is a region in which the negative electrode active material layer 110 faces the positive electrode active material layer 120. Specifically, the power generation region 140 is a region in which the negative electrode active material layer 110 and the positive electrode active material layer 120 overlap each other in plan view. In plan view, the negative electrode active material layer 110 is formed outside the negative electrode opening 410 of the negative electrode current collector 210 and spaced apart therefrom, and the positive electrode active material layer 120 is formed outside the positive electrode opening 420 of the positive electrode current collector 220 and spaced apart therefrom. Therefore, the power generation region 140 is located so as to surround the opening hole 440 penetrating the power generation element 100.

The negative electrode current collector 210 and the positive electrode current collector 220 are each an electrically conductive member. The negative electrode current collector 210 and the positive electrode current collector 220 may each be an electrically conductive thin film. A metal such as stainless steel (SUS), aluminum (Al), or copper (Cu) can be used as the material forming the negative electrode current collector 210 and the positive electrode current collector 220.

The negative electrode current collector 210 is disposed in contact with the negative electrode active material layer 110. The negative electrode current collector used may be, for example, a metal foil such as a SUS foil or a Cu foil. The thickness of the negative electrode current collector 210 is, for example, equal to or more than 5 μm and equal to or less than 100 μm but is not limited thereto. The negative electrode current collector 210 may include, for example, a current collector layer containing an electrically conductive material in a portion in contact with the negative electrode active material layer 110.

In plan view, the negative electrode current collector 210 is formed so as to be larger than the negative electrode active material layer 110. In FIG. 1(b), a first region 230 is shown which is a region extending along at least part of the outer circumference of the negative electrode opening 410 of the negative electrode current collector 210 and in which the negative electrode active material layer 110 is not disposed. In embodiment 1, the negative electrode active material layer 110 is located so as to surround the negative electrode opening 410 of the negative electrode current collector 210 in plan view, and therefore the first region 230 is disposed over the entire outer circumference of the negative electrode opening 410 of the negative electrode current collector 210. Specifically, in plan view, the first region 230 may have a rectangular annular shape with a prescribed line width or may have a circular annular shape.

The positive electrode current collector 220 is disposed in contact with the positive electrode active material layer 120. The positive electrode current collector 220 used may be, for example, a metal foil such as a SUS foil or an Al foil. The thickness of the positive electrode current collector 220 is, for example, equal to or more than 5 μm and equal to or less than 100 μm but is not limited thereto. The positive electrode current collector 220 may include, for example, a current collector layer containing an electrically conductive material in a portion in contact with the positive electrode active material layer 120.

In plan view, the positive electrode current collector 220 is formed so as to be larger than the positive electrode active material layer 120. In FIG. 1(b), a second region 240 is shown which is a region extending along at least part of the outer circumference of the positive electrode opening 420 of the positive electrode current collector 220 and in which the positive electrode active material layer 120 is not disposed. In embodiment 1, the positive electrode active material layer 120 is located so as to surround the positive electrode opening 420 of the positive electrode current collector 220 in plan view, and therefore the second region 240 is disposed over the entire outer circumference of the positive electrode opening 420 of the positive electrode current collector 220. Specifically, in plan view, the second region 240 may have a rectangular annular shape with a prescribed line width or may have another shape such as a circular annular shape.

In embodiment 1, the negative electrode current collector 210 and the positive electrode current collector 220 are flat plates disposed parallel to each other. Specifically, the negative electrode current collector 210 and the positive electrode current collector 220 are flat plates with a uniform thickness and disposed parallel to each other. In embodiment 1, the gap between the negative electrode current collector 210 and the positive electrode current collector 220 in the laminating direction is kept approximately constant in plane directions. Specifically, the gap between the negative electrode current collector 210 and the positive electrode current collector 220 in the laminating direction in an encapsulation region 320 in which the sealing member 310 is disposed in plan view is approximately the same as the gap between the negative electrode current collector 210 and the positive electrode current collector 220 in the laminating direction in the power generation region 140.

The sealing member 310 is disposed between the negative electrode current collector 210 and the positive electrode current collector 220. The sealing member 310 is formed using, for example, an electrically insulating material. The sealing member 310 functions as a spacer for maintaining the gap between the negative electrode current collector 210 and the positive electrode current collector 220. The sealing member 310 is disposed between the negative electrode current collector 210 and the positive electrode current collector 220 and located on the outer circumference of the negative electrode opening 410 and the outer circumference of the positive electrode opening 420 in plan view and is used to encapsulate the power generation element 100. The sealing member 310 encapsulates the power generation element 100 such that at least part thereof is not in contact with outside air.

In embodiment 1, as shown in FIG. 1(a), the sealing member 310 is sandwiched between the negative electrode current collector 210 and the positive electrode current collector 220 and is in contact with the negative electrode current collector 210 and the positive electrode current collector 220. Specifically, the sealing member 310 is in contact with part of the surface of the negative electrode current collector 210 on which the negative electrode active material layer 110 is disposed and is located in the first region 230 in which the negative electrode active material layer 110 is not disposed. The sealing member 310 is in contact with part of a surface of the positive electrode current collector 220 on which the positive electrode active material layer 120 is disposed and is located in the second region 240 in which the positive electrode active material layer 120 is not disposed. Specifically, in plan view, the sealing member 310 is disposed in an area in which the first region 230 and the second region 240 face each other. The sealing member 310 may not be in contact with one of the negative electrode current collector 210 and the positive electrode current collector 220.

In embodiment 1, as shown in FIG. 1(a), the sealing member 310 is in contact with the power generation element 100. The positive electrode active material layer 120, the solid electrolyte layer 130, and the negative electrode active material layer 110 included in the power generation element 100 are not exposed in the opening hole 440. The sealing member 310 may be in contact with the side surfaces of at least one of the negative electrode active material layer 110, the positive electrode active material layer 120, or the solid electrolyte layer 130.

For example, as shown in FIG. 1(b), the encapsulation region 320 in which the sealing member 310 is disposed is adjacent to the power generation region 140 in plan view. The shape of the encapsulation region 320 in plan view may coincide with the shape of the sealing member 310 in plan view. When the shape of the opening hole 440 of the power generation element 100 in plan view is rectangular as shown in FIG. 1(b), the encapsulation region 320 may be located in contact with the sides of the rectangular shape representing the shape of the opening hole 440 of the power generation element 100 in plan view.

The sealing member 310 contains, for example, a first material. The sealing member 310 may be, for example, a member containing the first material as a main component. For example, the sealing member 310 may be composed only of the first material.

A well-known material for sealing members of batteries such as a sealing material may be used as the first material. Examples of the sealing material include ceramic-based sealing materials and resin-based sealing materials. The first material may contain an insulating material having no ionic conductivity. The first material contained may be a resin material. For example, the first material may contain any of thermosetting resins, photocurable resins such as UV curable resins, and hot-melt resins (thermoplastic resins). For example, the first material may contain at least one of a thermosetting or photocurable epoxy resin, a thermosetting or photocurable acrylic resin, a thermosetting or photocurable polyimide resin, or a thermosetting or photocurable silsesquioxane.

The sealing member 310 may contain a particulate metal oxide material. The metal oxide material used may be, for example, silicon oxide, aluminum oxide, titanium oxide, zinc oxide, cerium oxide, iron oxide, tungsten oxide, zirconium oxide, calcium oxide, zeolite, or glass. For example, the sealing member 310 may be formed using a resin material containing a plurality of metal oxide material particles dispersed therein.

It is only necessary that the particle size of the metal oxide material be equal to or smaller than the gap between the negative electrode current collector 210 and the positive electrode current collector 220. The shape of the metal oxide material particles may be circular (spherical), ellipsoidal, or a rod-like shape.

The sealing member 310 is disposed between the negative electrode current collector 210 and the positive electrode current collector 220 of the battery 1000 having the opening hole 440. Therefore, when a shock is applied to a portion near the opening hole 440 during insertion of another electronic or optical component into the opening hole 440, the influence of the shock on the power generation region 140 can be reduced. Moreover, by disposing the sealing member 310 so as to be in contact with the side surfaces of at least one of the negative electrode active material layer 110, the positive electrode active material layer 120, or the solid electrolyte layer 130, collapse of the negative electrode active material layer 110, the positive electrode active material layer 120, and the solid electrolyte layer 130 included in the power generation element 100 can be prevented. By disposing the sealing member 310 between the negative electrode current collector 210 and the positive electrode current collector 220 such that the sealing member 310 is in contact with the side surfaces of at least one of the negative electrode active material layer 110 or the positive electrode active material layer 120, the positive and negative electrodes of the power generation element 100 are prevented from coming into contact with each other, so that a short circuit can be prevented. The reliability of the battery can be improved through these effects.

Since the sealing member 310 is disposed between the negative electrode current collector 210 and the positive electrode current collector 220, an increase in the thickness of the battery 1000 can be prevented. Therefore, an extra space is not necessary when the battery is mounted, so that constraints on the mountability of the battery can be reduced.

[Modifications]

A plurality of modifications of embodiment 1 will be described. In the following description of the plurality of modifications, differences from embodiment 1 or differences between the modifications will be mainly described, and the description of common features will be omitted or simplified.

<Modification 1>

Figure 2:
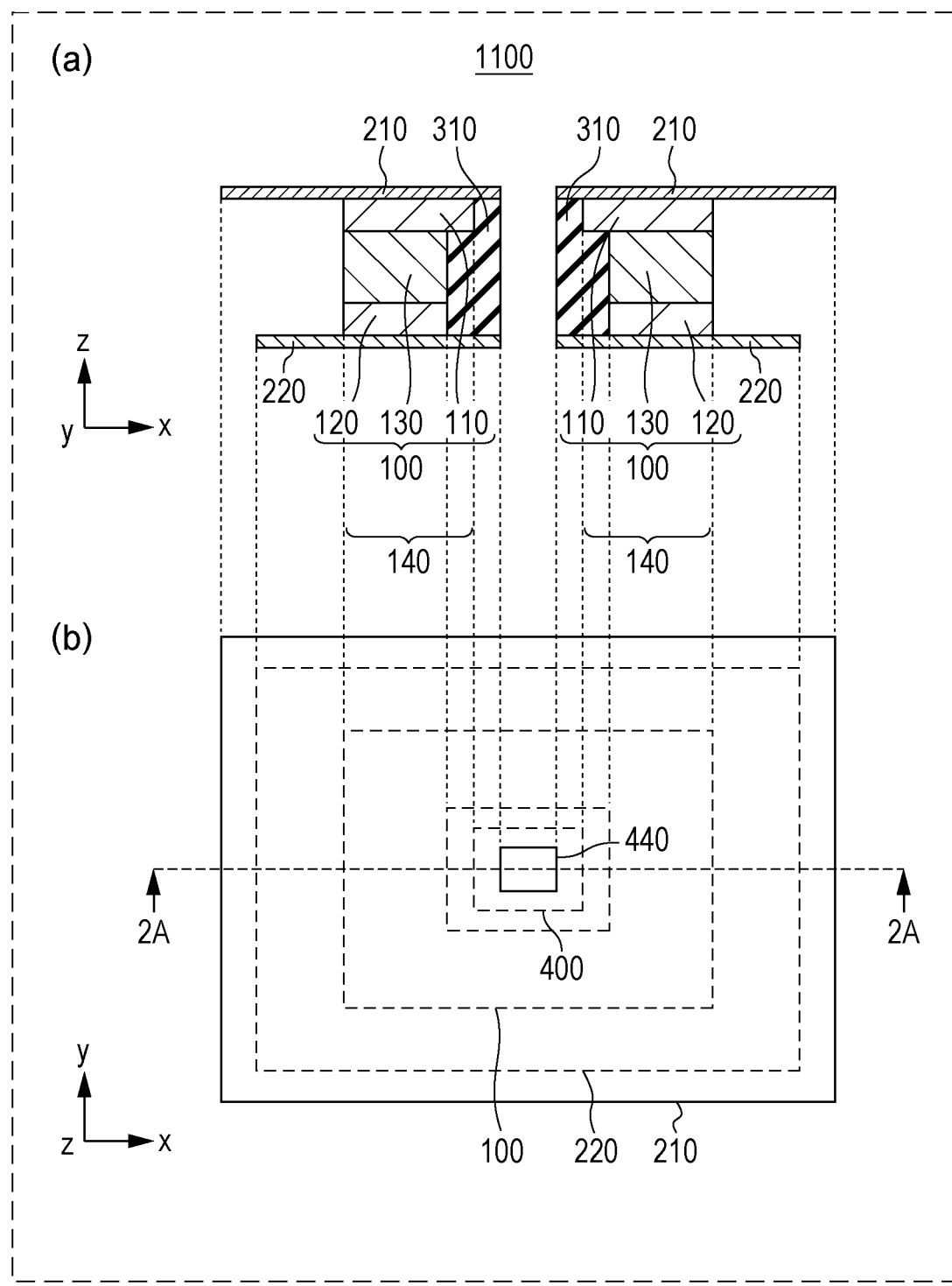
FIG. 2 shows illustrations of an example of a schematic structure of a battery in modification 1 of embodiment 1.

First, modification 1 of embodiment 1 will be described using FIG. 2. FIG. 2 shows illustrations of a schematic structure of a battery 1100 in modification 1 of embodiment 1. Specifically, FIG. 2(a) is a cross-sectional view showing the schematic structure of the battery 1100 and shows a cross section taken along line 2A-2A in FIG. 2(b). FIG. 2(b) is a transparent top view showing the schematic structure of the battery 1100. In FIG. 2(b), the shapes of components of the battery 1100 in plan view when the battery 1100 is viewed from above are represented by solid or broken lines.

As shown in FIG. 2, the battery 1100 differs from the battery 1000 in embodiment 1 in the following respects. Specifically, in the battery 1100, the side surfaces of the solid electrolyte layer 130 on the opening hole 440 side are located on a principal surface of the negative electrode active material layer 110 that faces the positive electrode current collector 220, and the sealing member 310 is disposed also on the principal surface of the negative electrode active material layer 110 that faces the positive electrode current collector 220. In plan view, the negative electrode active material layer 110 has a surface formed on the opening hole 440 side of the solid electrolyte layer 130. In plan view, a part of the laminating surface of the negative electrode active material layer 110 is formed on the opening hole 440 side of the solid electrolyte layer 130. The sealing member 310 is in contact with the part of the laminating surface of the negative electrode active material layer 110. In plan view, the side surfaces of the solid electrolyte layer 130 on the opening hole 440 side are located outside the side surfaces of the negative electrode active material layer 110 on the opening hole 440 side and are located inside the negative electrode active material layer 110.

Since the side surfaces of the solid electrolyte layer 130 are disposed on the principal surface of the negative electrode active material layer 110 that faces the positive electrode current collector 220, the side surfaces of the solid electrolyte layer 130 on the opening hole 440 side are held on the negative electrode active material layer 110 in a more reliable manner than when the side surfaces of the solid electrolyte layer 130 on the opening hole 440 side and the side surfaces of the negative electrode active material layer 110 on the opening hole 440 side overlap each other in plan view. Therefore, collapse of the solid electrolyte layer 130 can be more effectively prevented. At the same time, the surface of the negative electrode active material layer 110 that is not covered with the solid electrolyte layer 130 and faces the positive electrode current collector 220 and the side surfaces of the negative electrode active material layer 110 on the opening hole 440 side are firmly held directly by the sealing member 310, so that collapse of the power generation element 100 can be more effectively prevented.

In the above structure, the side surfaces of the solid electrolyte layer 130 on the opening hole 440 side are formed on the principal surface of the negative electrode active material layer 110 that faces the positive electrode current collector 220, and the surface of the negative electrode active material layer 110 that is not covered with the solid electrolyte layer 130 and faces the positive electrode current collector 220 can be firmly held directly by the sealing member 310. Therefore, collapse of the power generation element 100 can be prevented, and the reliability of the battery can be improved.

<Modification 2>

Figure 3:
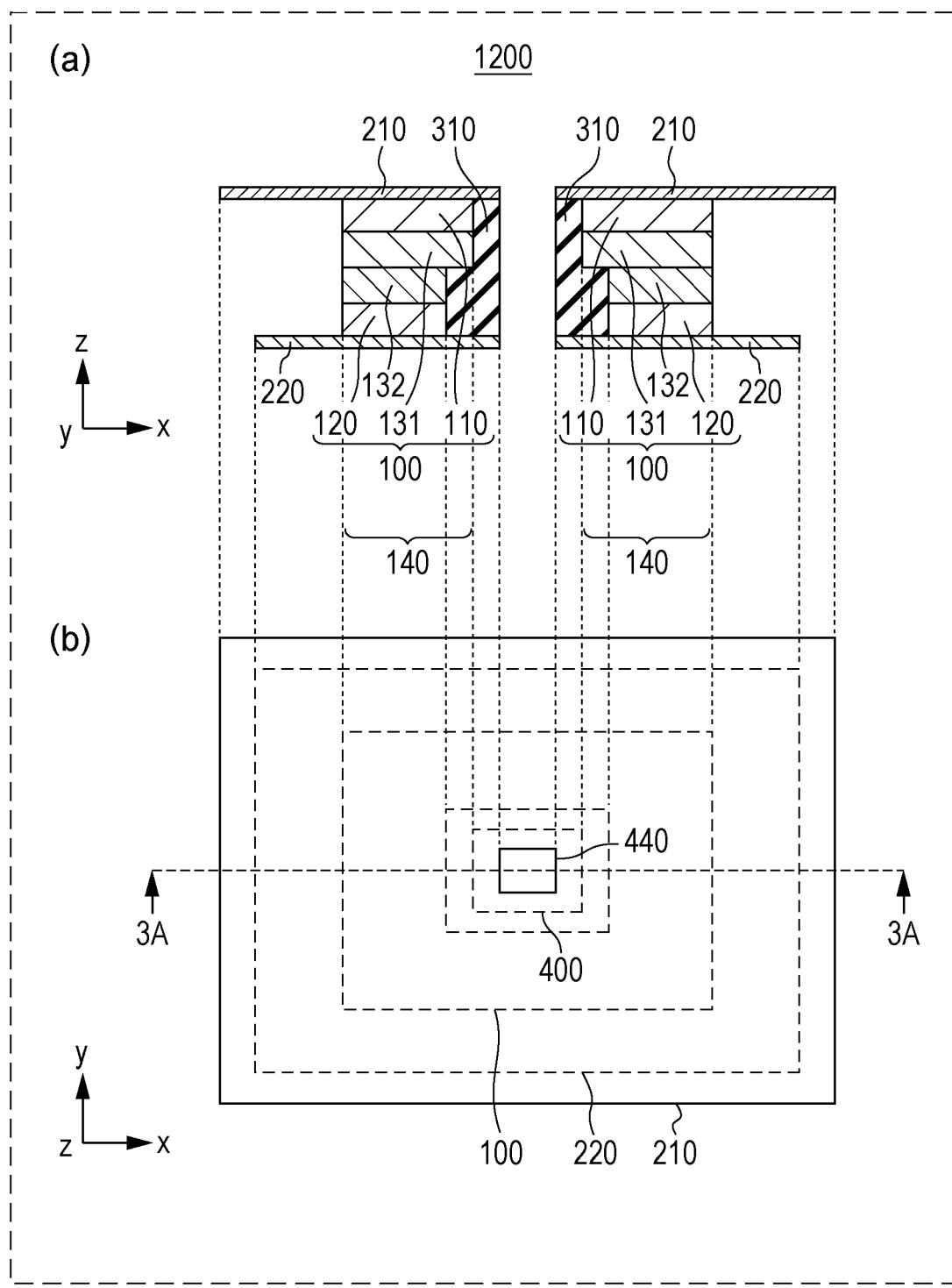
FIG. 3 shows illustrations of an example of a schematic structure of a battery in modification 2 of embodiment 1.

Modification 2 of embodiment 1 will be described using FIG. 3. FIG. 3 shows illustrations of a schematic structure of a battery 1200 in modification 2 of embodiment 1. Specifically, FIG. 3(a) is a cross-sectional view showing the schematic structure of the battery 1200 and shows a cross section taken along line 3A-3A in FIG. 3(b). FIG. 3(b) is a transparent top view showing the schematic structure of the battery 1200. In FIG. 3(b), the shapes of components of the battery 1200 in plan view when the battery 1200 is viewed from above are represented by solid or broken lines.

As shown in FIG. 3, the battery 1200 differs from the battery 1000 in embodiment 1 in the following respects. Specifically, the battery 1200 includes, as the solid electrolyte layer, a first solid electrolyte layer 131 on the negative electrode active material layer 110 side and a second solid electrolyte layer 132 on the positive electrode active material layer 120 side, and the sealing member 310 is disposed also on a principal surface of the first solid electrolyte layer 131 that faces the positive electrode current collector 220. In plan view, the first solid electrolyte layer 131 has a surface formed on the opening hole 440 side of the second solid electrolyte layer 132. In plan view, a part of the laminating surface of the first solid electrolyte layer 131 is formed on the opening hole 440 side of the second solid electrolyte layer 132. The sealing member 310 is in contact with the part of the laminating surface of the first solid electrolyte layer 131. In plan view, the side surfaces of the first solid electrolyte layer 131 on the opening hole 440 side are located at positions overlapping the side surfaces of the negative electrode active material layer 110 on the opening hole 440 side, and the side surfaces of the second solid electrolyte layer 132 on the opening hole 440 side are located outside the side surfaces of the first solid electrolyte layer 131 on the opening hole 440 side and located inside the first solid electrolyte layer 131.

Since the sealing member 310 is present on the principal surface of the first solid electrolyte layer 131 that faces the positive electrode current collector 220, the side surfaces of the first solid electrolyte layer 131 can be covered with the sealing member 310 reliably, and a portion of the first solid electrolyte layer 131 that does not face the second solid electrolyte layer 132 can be firmly held. Therefore, the first solid electrolyte layer 131 can be prevented from coming off.

In the above structure, portions around the side surfaces of the first solid electrolyte layer 131 and the second solid electrolyte layer 132 can be firmly held directly by the sealing member 310. Therefore, collapse of the power generation element 100 can be prevented, and the reliability of the battery can be improved.

<Modification 3>

Figure 4:
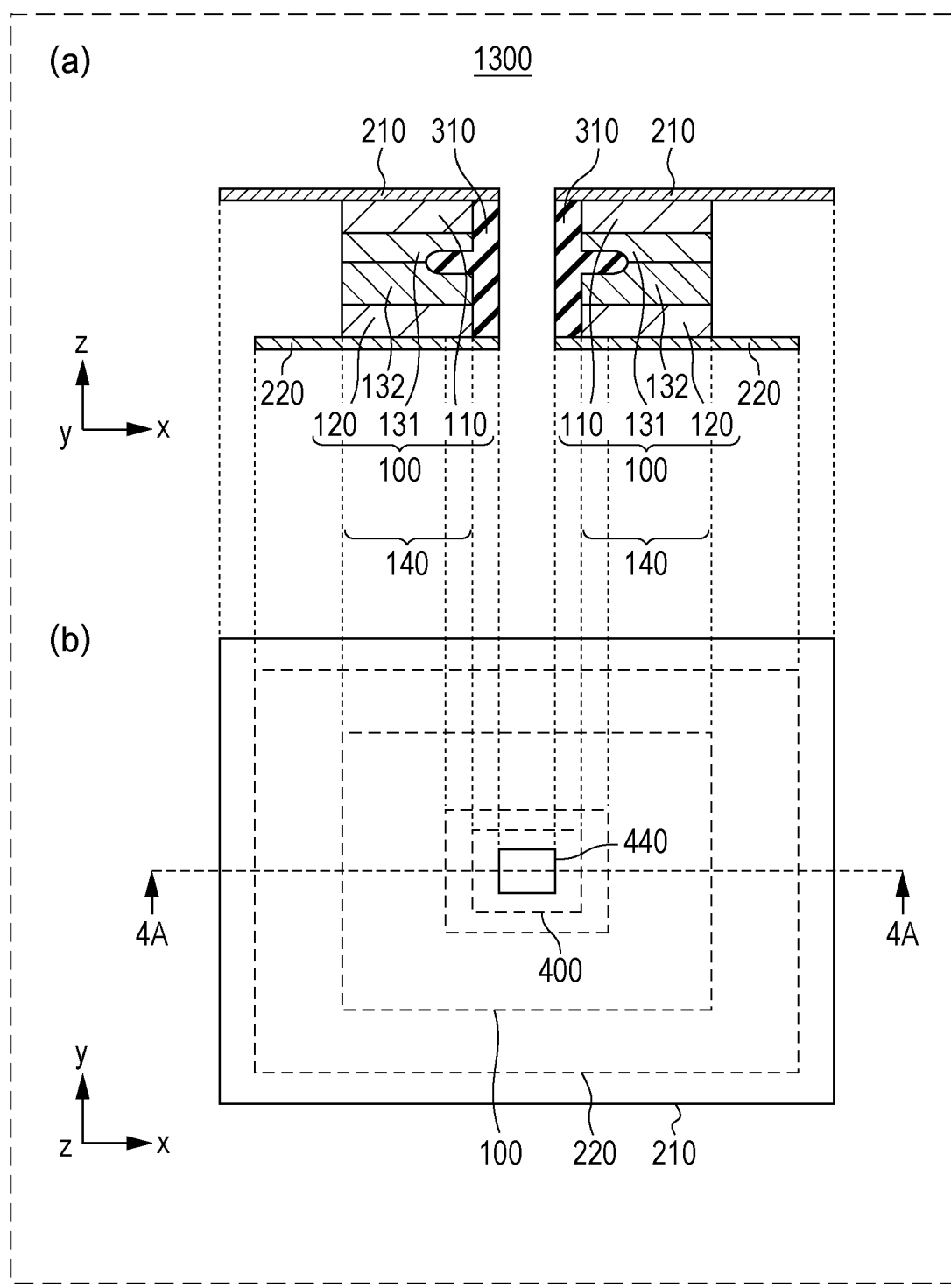
FIG. 4 shows illustrations of an example of a schematic structure of a battery in modification 3 of embodiment 1.

Modification 3 of embodiment 1 will be described using FIG. 4. FIG. 4 shows illustrations of a schematic structure of a battery 1300 in modification 3 of embodiment 1. Specifically, FIG. 4(a) is a cross-sectional view showing the schematic structure of the battery 1300 and shows a cross section taken along line 4A-4A in FIG. 4(b). FIG. 4(b) is a transparent top view showing the schematic structure of the battery 1300. In FIG. 4(b), the shapes of components of the battery 1300 in plan view when the battery 1300 is viewed from above are represented by solid or broken lines.

As shown in FIG. 4, the battery 1300 differs from the battery 1000 in embodiment 1 in the following respects. Specifically, the battery 1300 includes, as the solid electrolyte layer, the first solid electrolyte layer 131 on the negative electrode active material layer 110 side and the second solid electrolyte layer 132 on the positive electrode active material layer 120 side, and the sealing member 310 protrudes between the first solid electrolyte layer 131 and the second solid electrolyte layer 132. Specifically, the sealing member 310 has a shape protruding into the solid electrolyte layer. Since the first solid electrolyte layer 131 and the second solid electrolyte layer 132 are supported by the protruding portion of the sealing member 310, collapse of the solid electrolyte layers can be prevented even when an external force is applied to the opening hole 440. Therefore, the risk of breakage of the power generation element 100 can be reduced, and the reliability of the battery can be improved.

The same solid electrolyte material may be used for the first solid electrolyte layer 131 and the second solid electrolyte layer 132, or different solid electrolyte materials may be used.

<Modification 4>

Figure 5:
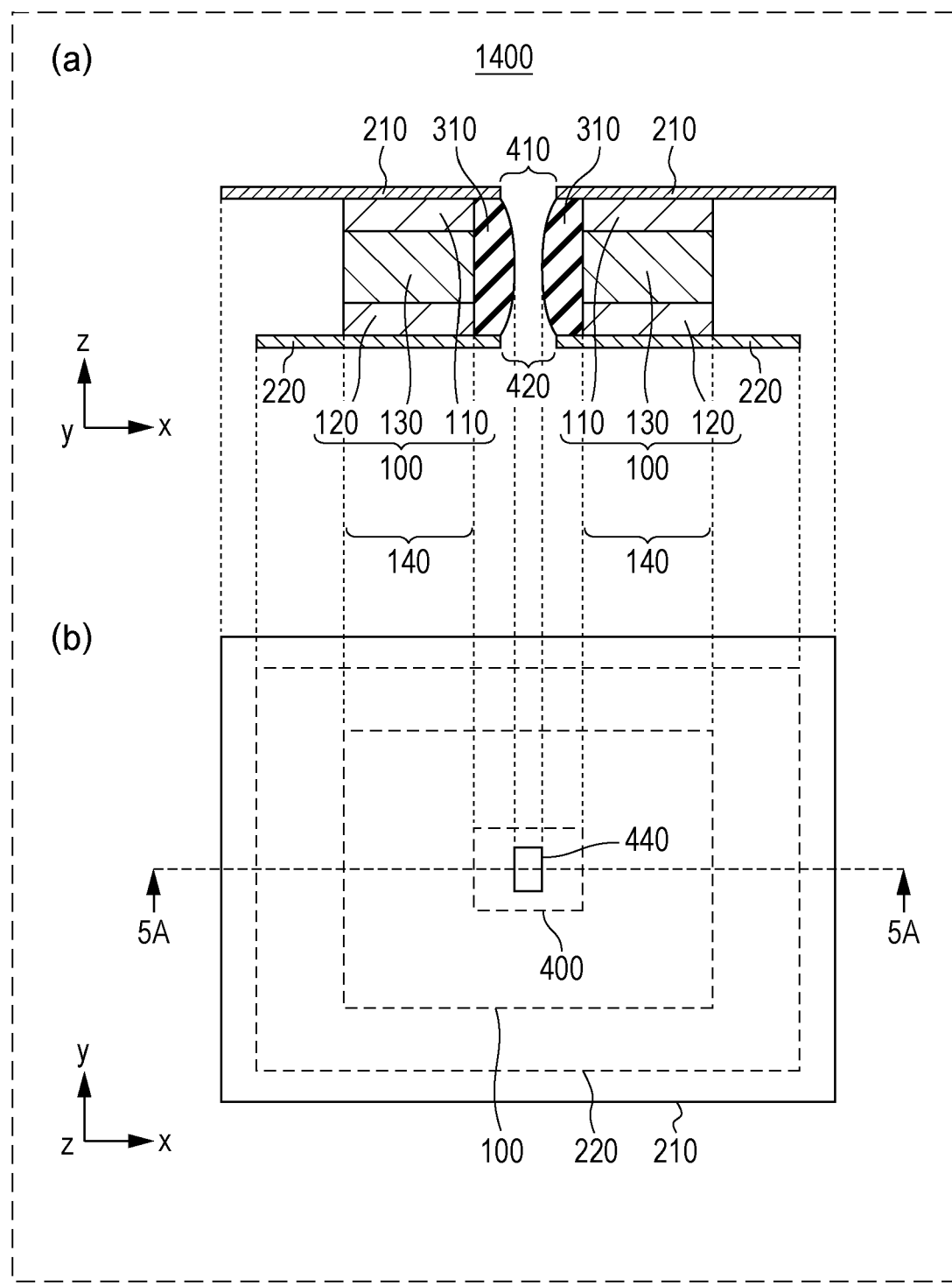
FIG. 5 shows illustrations of an example of a schematic structure of a battery in modification 4 of embodiment 1.

Modification 4 of embodiment 1 will be described using FIG. 5. FIG. 5 shows illustrations of a schematic structure of a battery 1400 in modification 4 of embodiment 1. Specifically, FIG. 5(a) is a cross-sectional view showing the schematic structure of the battery 1400 and shows a cross section taken along line 5A-5A in FIG. 5(b). FIG. 5(b) is a transparent top view showing the schematic structure of the battery 1400. In FIG. 5(b), the shapes of components of the battery 1400 in plan view when the battery 1400 is viewed from above are represented by solid or broken lines.

As shown in FIG. 5, the battery 1400 differs from the battery 1000 in embodiment 1 in the following respects. Specifically, in the battery 1400, the sealing member 310 protrudes inward beyond the negative electrode opening 410 and the positive electrode opening 420. The sealing member 310 has a shape protruding into the opening hole 440. Since the sealing member 310 protrudes inward beyond the negative electrode opening 410 and the positive electrode opening 420, the negative electrode current collector 210 or the positive electrode current collector 220 is prevented from receiving an external form directly even when another member or component is inserted through the negative electrode opening 410 or the positive electrode opening 420. Moreover, the influence of the external force on the power generation element 100 can be reduced. Therefore, delamination of the negative electrode current collector 210 and the positive electrode current collector 220 and collapse of the power generation element can be prevented, and the mechanical strength of the battery can be improved.

<Modification 5>

Figure 6:
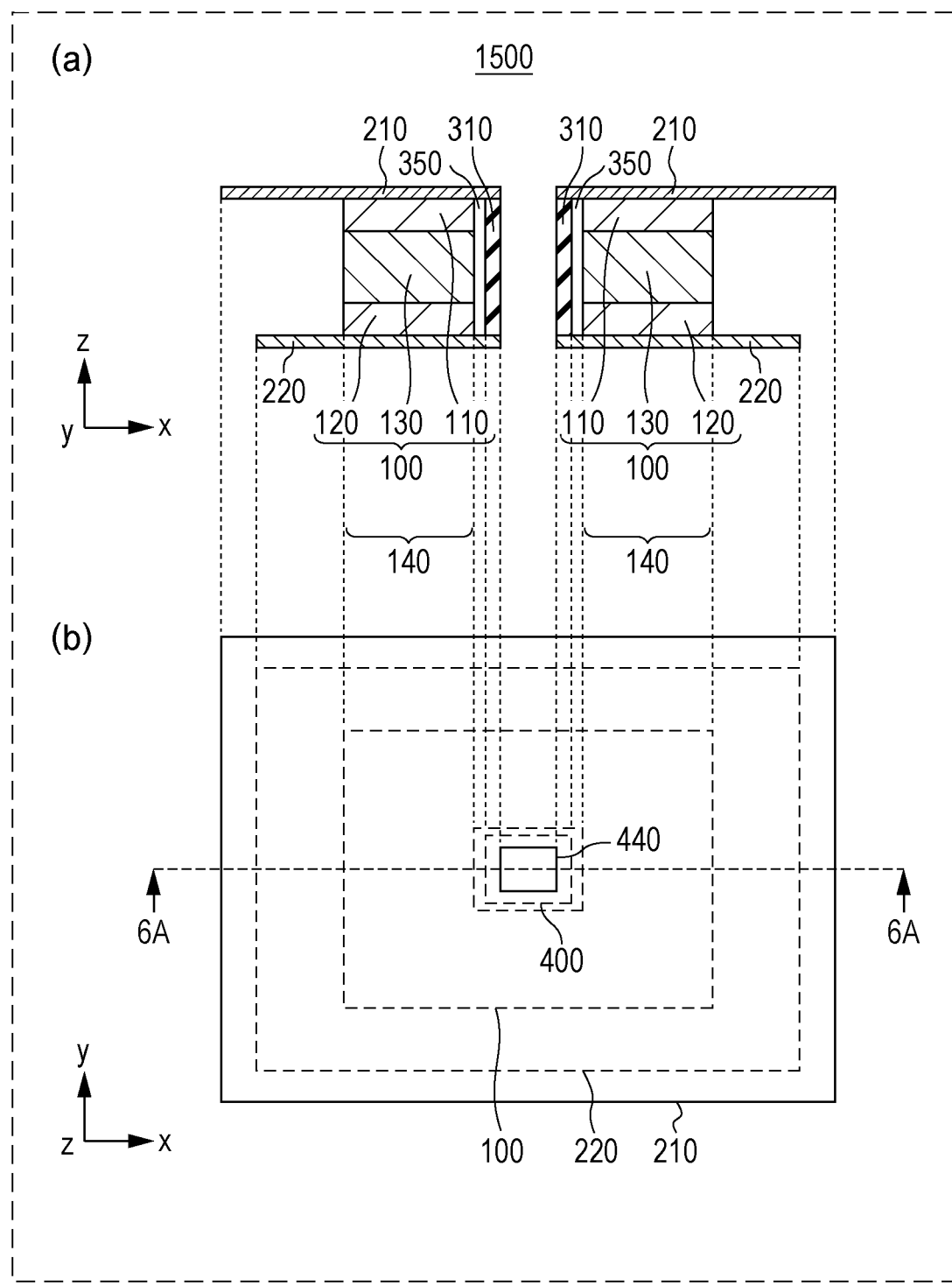
FIG. 6 shows illustrations of an example of a schematic structure of a battery in modification 5 of embodiment 1.

Modification 5 of embodiment 1 will be described using FIG. 6. FIG. 6 shows illustrations of a schematic structure of a battery 1500 in modification 5 of embodiment 1. Specifically, FIG. 6(a) is a cross-sectional view showing the schematic structure of the battery 1500 and shows a cross section taken along line 6A-6A in FIG. 6(b). FIG. 6(b) is a transparent top view showing the schematic structure of the battery 1500. In FIG. 6(b), the shapes of components of the battery 1500 in plan view when the battery 1500 is viewed from above are represented by solid or broken lines.

As shown in FIG. 6, the battery 1500 differs from the battery 1000 in embodiment 1 in the following respects. Specifically, the battery 1500 has a space 350 between the sealing member 310 and the power generation element 100 including the negative electrode active material layer 110, the positive electrode active material layer 120, and the solid electrolyte layer 130. The space 350 is filled with a gas. The gas is, for example, air but may be a noble gas such as argon or nitrogen. The pressure inside the space 350 may be lower than the atmospheric pressure.

In this case, the reliability of the battery can be improved. Specifically, when an external force is applied to the opening hole 440 to cause the sealing member 310 to deform, the power generation element 100 is prevented from receiving a mechanical shock because the space 350 is present between the power generation element 100 and the sealing member 310. Therefore, collapse of the power generation element 100 due to a mechanical shock such as an external force can be prevented, and the mechanical strength of the battery can be improved.

Moreover, the power generation element 100 is in contact with the space 350. Therefore, even when a gas is generated from the power generation element 100 during charging or discharging, the pressure of the gas can be relaxed by the space 350, so that delamination in the power generation element 100 caused by the gas generated can be prevented from proceeding.

<Modification 6>

Figure 7:
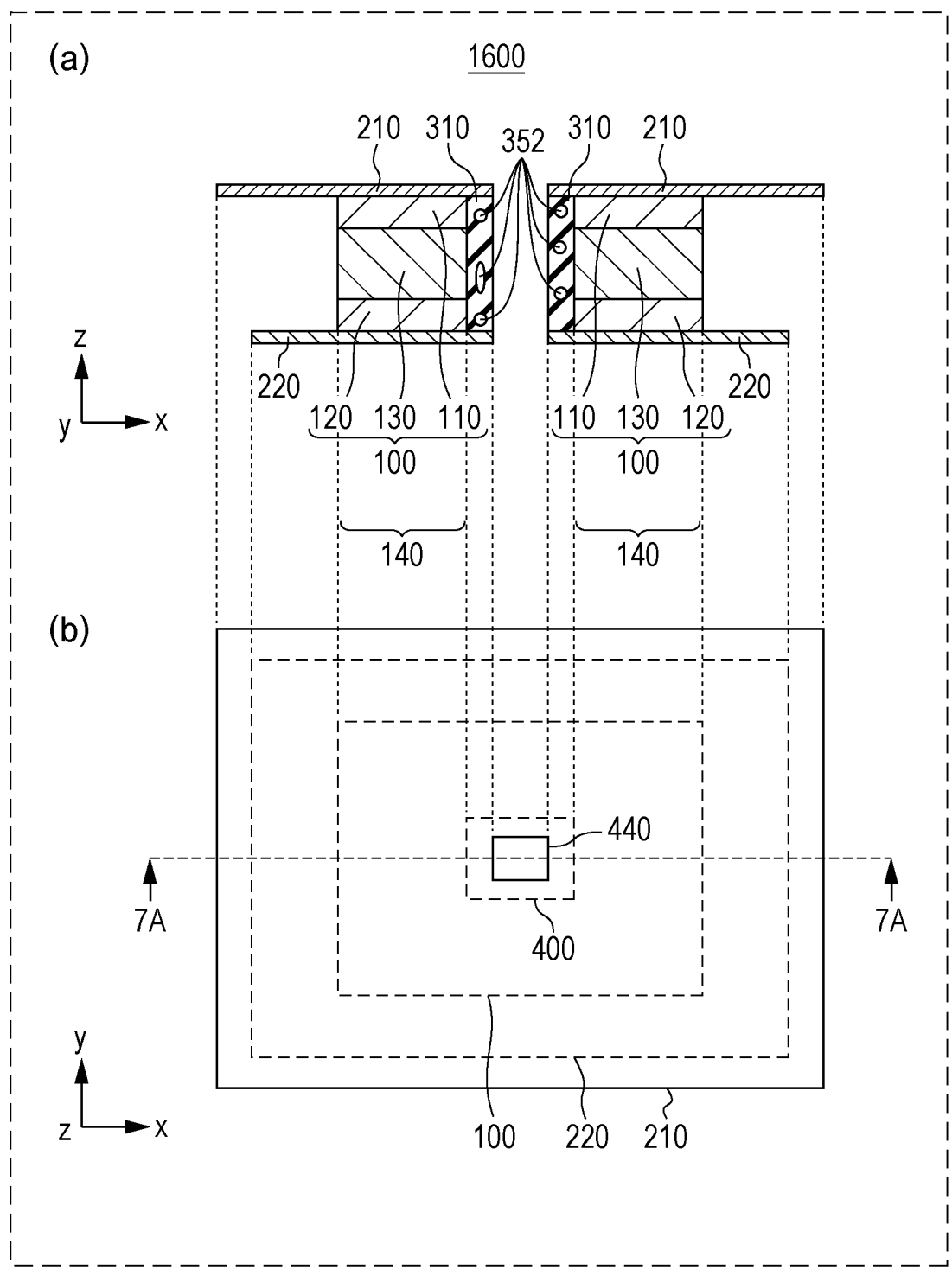
FIG. 7 shows illustrations of an example of a schematic structure of a battery in modification 6 of embodiment 1.

Modification 6 of embodiment 1 will be described using FIG. 7. FIG. 7 shows illustration of a schematic structure of a battery 1600 in modification 6 of embodiment 1. Specifically, FIG. 7(a) is a cross-sectional view showing the schematic structure of the battery 1600 and shows a cross section taken along line 7A-7A in FIG. 7(*b*). FIG. 7(*b*) is a transparent top view showing the schematic structure of the battery 1600. In FIG. 7(*b*), the shapes of components of the battery 1600 in plan view when the battery 1600 is viewed from above are represented by solid or broken lines.

As shown in FIG. 7, the battery 1600 differs from the battery 1000 in embodiment 1 in the following respects. Specifically, in the battery 1600, the sealing member 310 has cavities 352 smaller than the thickness and width of the sealing member 310. Specifically, the battery 1600 has the cavities 352 inside the sealing member 310. The cavities 352 are independent cavities present inside the sealing member 310 and fully surrounded by the sealing member 310. The cavities 352 are filled with a gas. The gas is, for example, air but may be a noble gas such as argon or nitrogen. The pressure inside the cavities 352 may be lower than the atmospheric pressure. Each void 352 is an example of the space.

In this case, the reliability of the battery can be improved. Specifically, when an external force is applied to the opening hole 440, part of the deformation of the sealing member 310 can be absorbed by the cavities 352 in the sealing member 310. Therefore, the degree of propagation of the mechanical shock due to the external force to the power generation element 100 can be reduced. Collapse of the power generation element 100 can thereby be prevented, and the mechanical strength of the battery can be improved.

Moreover, even when a gas is generated from the power generation element 100 during charging or discharging, the cavities 352 relax the pressure of the gas, and the progress of delamination in the power generation element 100 due to the gas generated can be prevented.

<Modification 7>

Figure 8:
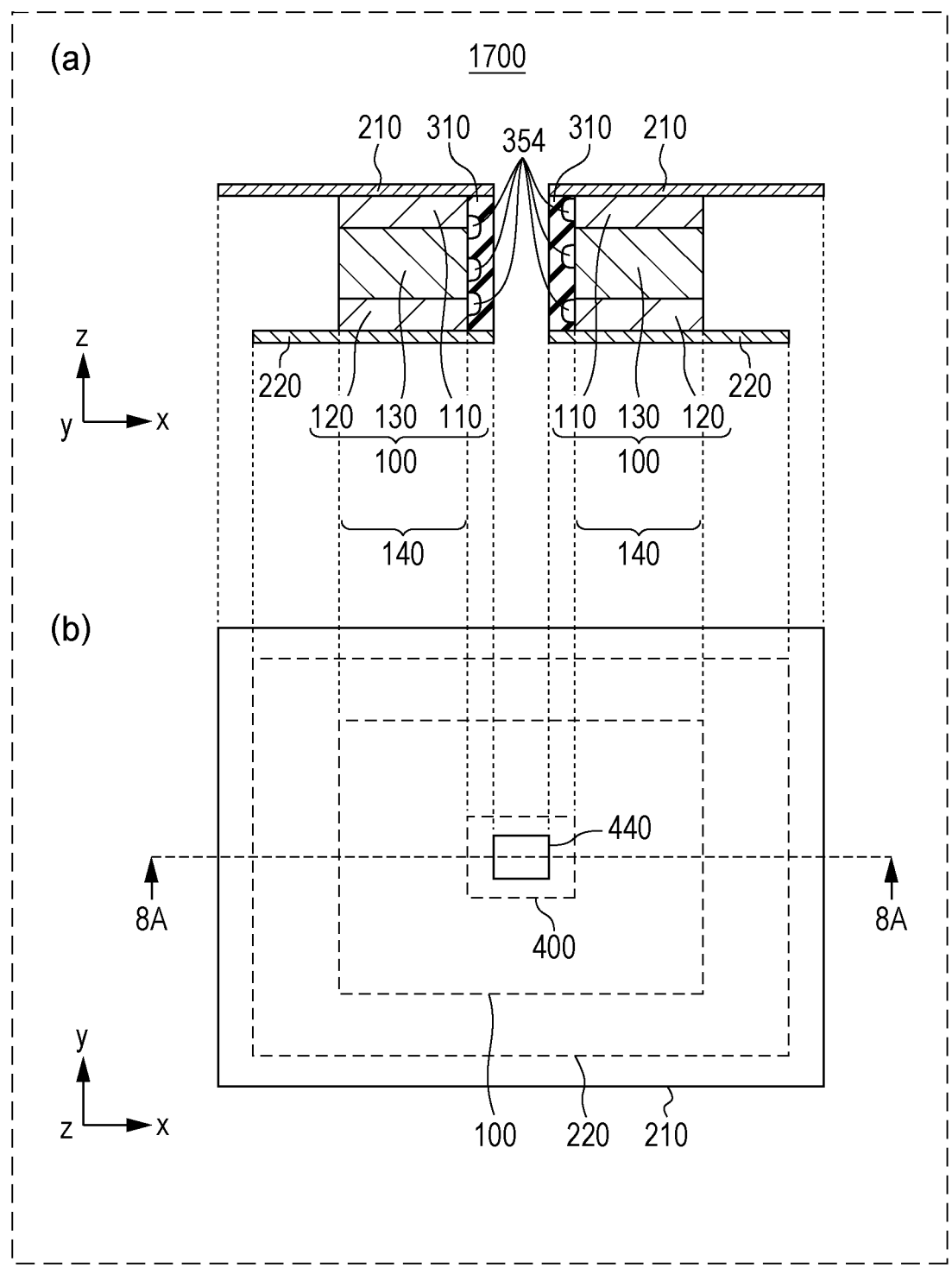
FIG. 8 shows illustrations of an example of a schematic structure of a battery in modification 7 of embodiment 1.

Modification 7 of embodiment 1 will be described using FIG. 8. FIG. 8 shows illustrations of a schematic structure of a battery 1700 in modification 7 of embodiment 1. Specifically, FIG. 8(*a*) is a cross-sectional view showing the schematic structure of the battery 1700 and shows a cross section taken along line 8A-8A in FIG. 8(*b*). FIG. 8(*b*) is a transparent top view showing the schematic structure of the battery 1700. In FIG. 8(*b*), the shapes of components of the battery 1700 in plan view when the battery 1700 is viewed from above are represented by solid or broken lines.

As shown in FIG. 8, the battery 1700 differs from the battery 1000 in embodiment 1 in the following respects. Specifically, the battery 1700 has cavities 354 located between the power generation element 100 and the sealing member 310. The power generation element 100 and the sealing member 310 are joined together, and the cavities 354 are present on the joint surface. Specifically, the cavities 354 are in contact with the sealing member 310 and at least one of the positive electrode active material layer 120, the solid electrolyte layer 130, or the negative electrode active material layer 110. The cavities 354 are filled with a gas. The gas is, for example, air but may be a noble gas such as argon or nitrogen. The pressure inside the cavities 354 may be lower than the atmospheric pressure. Each void 354 is an example of the space.

In this case, the reliability of the battery can be improved. Specifically, since the power generation element 100 is supported by the sealing member 310, collapse of the power generation element 100 is prevented. Moreover, even when an external force is applied to the opening hole 440, part of the deformation of the sealing member 310 can be absorbed by the cavities 354 disposed in the sealing member 310. The power generation element 100 is supported as described above, and the degree of propagation of the mechanical shock due to the external force can be reduced. Therefore, collapse of the power generation element can be prevented, and the mechanical strength of the battery can be improved.

Moreover, the power generation element 100 is in contact with the cavities 354. Therefore, even when a gas is generated from the power generation element 100, for example, during charging or discharging, the cavities 354 relax the pressure of the gas, and the progress of delamination in the power generation element 100 due to the gas generated can be prevented.

<Modification 8>

Figure 9:
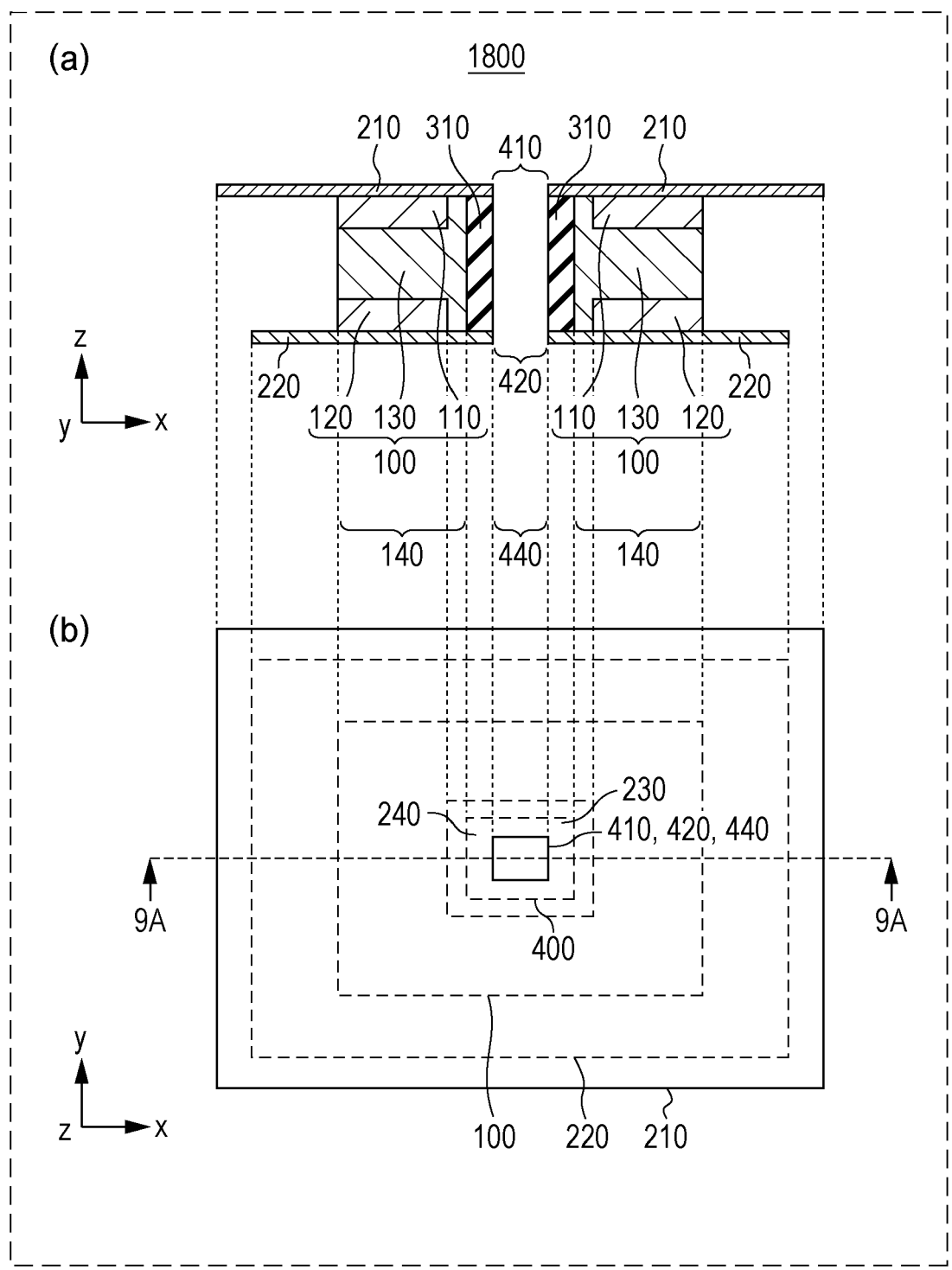
FIG. 9 shows illustrations of an example of a schematic structure of a battery in modification 8 of embodiment 1.

Modification 8 of embodiment 1 will be described using FIG. 9. FIG. 9 shows illustrations of a schematic structure of a battery 1800 in modification 8 of embodiment 1. Specifically, FIG. 9(*a*) is a cross-sectional view showing the schematic structure of the battery 1800 and shows a cross section taken along line 9A-9A in FIG. 9(*b*). FIG. 9(*b*) is a transparent top view showing the schematic structure of the battery 1800. In FIG. 9(*b*), the shapes of components of the battery 1800 in plan view when the battery 1800 is viewed from above are represented by solid or broken lines.

As shown in FIG. 9, the battery 1800 differs from the battery 1000 in embodiment 1 in the following respects. Specifically, in the battery 1800, the solid electrolyte layer 130 is formed in a region larger than the negative electrode active material layer 110 and the positive electrode active material layer 120 in plan view so as to cover the side surfaces of the negative electrode active material layer 110 on the negative electrode opening 410 side and the side surfaces of the positive electrode active material layer 120 on the positive electrode opening 420 side.

In this case, the reliability of the battery can be improved. Specifically, by covering the side surfaces of the negative electrode active material layer 110 on the opening hole 440 side and the side surfaces of the positive electrode active material layer 120 on the opening hole 440 side with the solid electrolyte layer 130 in a reliable manner, a change in the area of the power generation region 140 caused by collapse of the side surfaces of the negative electrode active material layer 110 on the opening hole 440 side and the side surfaces of the positive electrode active material layer 120 on the opening hole 440 side is prevented, so that the capacity of the battery can be maintained. Since the sealing member 310 can hold the solid electrolyte layer 130, even when an external force is applied to the opening hole 440, collapse of the power generation element 100 can be prevented, and the mechanical strength of the battery can be improved.

The structure in which the solid electrolyte layer 130 covers the side surfaces of the negative electrode active material layer 110 on the negative electrode opening 410 side and the side surfaces of the positive electrode active material layer 120 on the positive electrode opening 420 side is applicable to the above-described modes of the battery, e.g., to the batteries 1300, 1400, 1500, 1600, and 1700.

<Modification 9>

Figure 10:
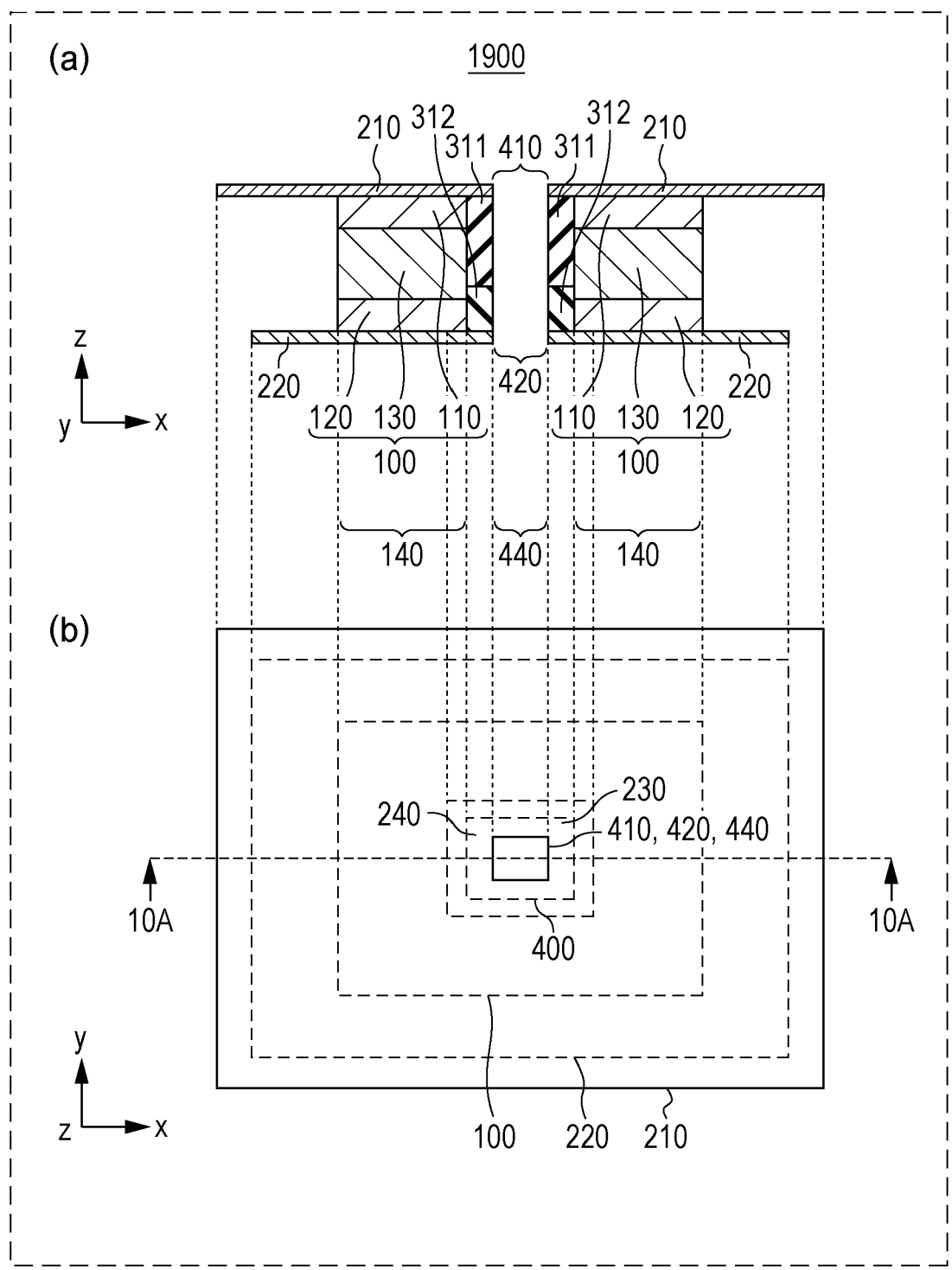
FIG. 10 shows illustrations of an example of a schematic structure of a battery in modification 9 of embodiment 1.

Modification 9 of embodiment 1 will be described using FIG. 10. FIG. 10 shows illustrations of a schematic structure of a battery 1900 in modification 9 of embodiment 1. Specifically, FIG. 10(*a*) is a cross-sectional view showing the schematic structure of the battery 1900 and shows a cross section taken along line 10A-10A in FIG. 10(*b*). FIG. 10(*b*) is a transparent top view showing the schematic structure of the battery 1900. In FIG. 10(*b*), the shapes of components of the battery 1900 in plan view when the battery 1900 is viewed from above are represented by solid or broken lines.

As shown in FIG. 10, unlike the battery 1000 in embodiment 1, the battery 1900 includes a first sealing member 311 and a second sealing member 312 instead of the sealing member 310.

The first sealing member 311 is located on a side close to the negative electrode current collector 210 and contains the first material. The second sealing member 312 is located on a side closer to the positive electrode current collector 220 than the first sealing member 311 and contains a second material. The second material differs from the first material. The second material is, for example, an insulating material having no ionic conductivity. The second material may contain a resin or a sealing material. The second material may be, for example, a material selected from the plurality of materials usable as the first material and different from the material(s) contained in the first sealing member 311. For example, the second material may be a material that is selected from epoxy resins, acrylic resins, polyimide resins, and silsesquioxanes each having thermosetting or photocurable properties and is not contained in the first sealing member 311. The second material may contain a particulate metal oxide material.

With the structure including the first sealing member 311 and the second sealing member 312, materials most optimal for the sealing members on the positive and negative electrode sides can be selected in terms of reactivity and mechanical properties. The reliability of the battery 1900 can thereby be further improved.

[Method for Producing Battery]

Next, a description will be given of an example of a method for producing the batteries in embodiment 1 and the modifications. Specifically, a method for producing the battery 1800 in modification 8 will be described using FIG. 11. This method can also be applied to the batteries 1000, 1100, 1200, 1300, 1400, 1500, 1600, 1700, and 1900.

Figure 11:
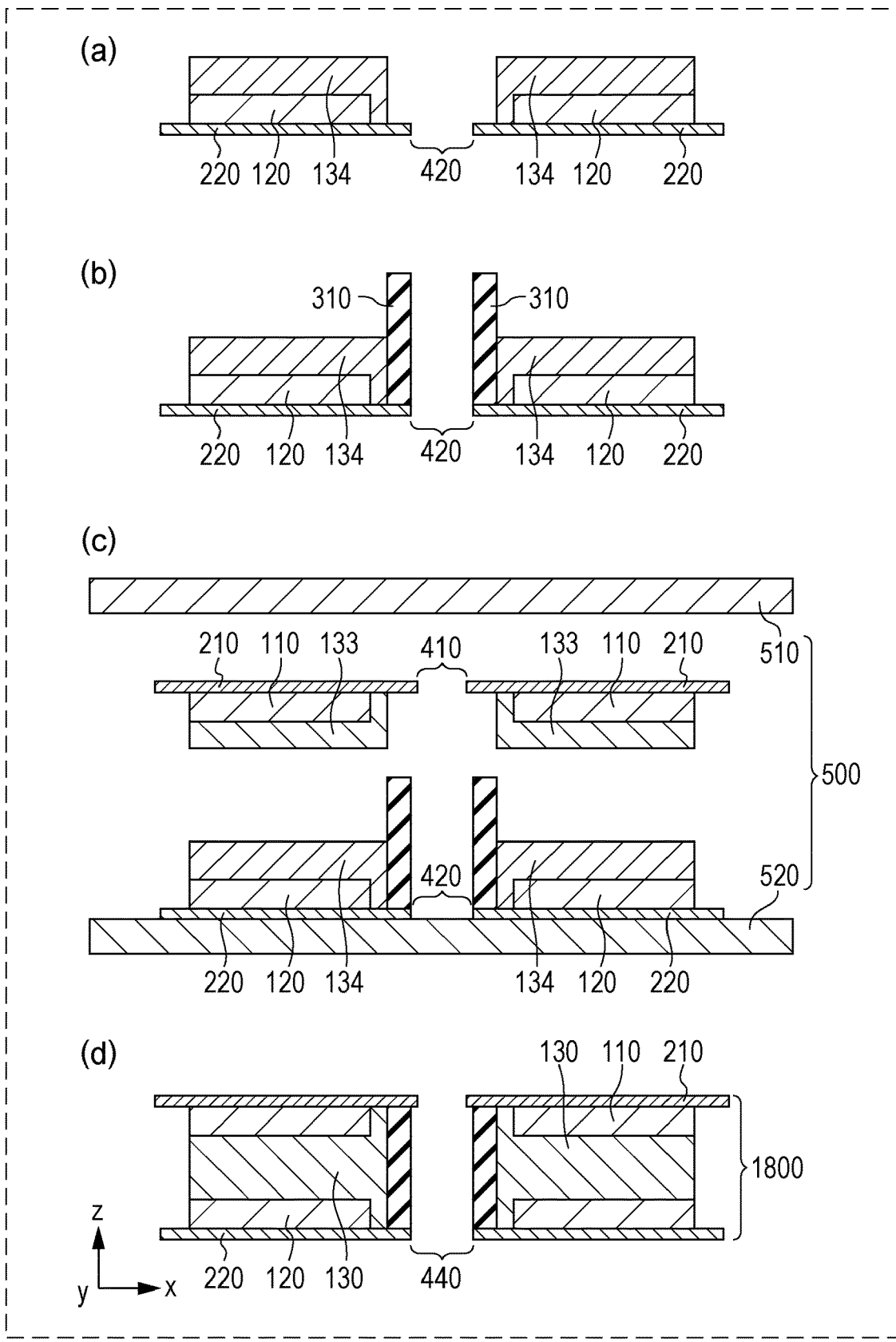
FIG. 11 shows illustrations of an example of a battery forming process in embodiment 1.

FIG. 11 shows cross-sectional views of an example of the method for producing the battery 1800.

First, a positive electrode material and a solvent are kneaded to prepare a paste-like coating material. The coating material is applied to the positive electrode current collector 220 having the positive electrode opening 420 so as to cover an area spaced outward from the positive electrode opening 420.

Specifically, the positive electrode active material layer 120 is formed. Then a solid electrolyte material and a solvent are kneaded to prepare a paste-like coating material. The coating material is applied to the positive electrode current collector 220 so as to cover an area spaced outward from the positive electrode opening 420 such that the upper surface of the applied positive electrode active material layer 120 and its side surfaces on the positive electrode opening 420 side are covered. The coating material applied is then dried. Specifically, a positive electrode-side solid electrolyte layer 134 is formed. A positive electrode plate having the positive electrode opening 420 and shown in FIG. 11(a) is thereby produced. The positive electrode material and the solid electrolyte material may be prepared as materials containing no solvent.

Next, as shown in FIG. 11(b), an encapsulating material is applied to the periphery of the positive electrode opening 420, i.e., to the positive electrode current collector 220 so as to cover an area between the positive electrode opening 420 and the region on which the positive electrode active material layer 120 and the positive electrode-side solid electrolyte layer 134 have been formed. Specifically, the sealing member 310 is formed. The encapsulating material is applied such that the thickness of the sealing member 310 is approximately the same or slightly larger than the total thickness of the positive electrode active material layer 120, the positive electrode-side solid electrolyte layer 134, the negative electrode active material layer 110, and a negative electrode-side solid electrolyte layer 133 to be laminated. In this manner, the degree of spread of the encapsulating material during the formation of the battery can be controlled.

When the encapsulating material is applied so as to extend from the positive electrode current collector 220 to the positive electrode-side solid electrolyte layer 134, the thickness of the encapsulating material applied to the positive electrode-side solid electrolyte layer 134 is, for example, set to a value obtained by subtracting the total thickness of the positive electrode active material layer 120 and the positive electrode-side solid electrolyte layer 134 from the thickness of the encapsulating material applied to the positive electrode current collector 220. In this manner, the encapsulating material applied can have a substantially flat surface (i.e., a substantially flat upper surface). Alternatively, by appropriately controlling the thickness of the encapsulating material applied to the positive electrode-side solid electrolyte layer 134 and the thickness of the encapsulating material applied to the positive electrode current collector 220, a step can be formed on the surface of the encapsulating material applied. Another method for forming a step on the surface of the encapsulating material applied includes applying the encapsulating material in a plurality of steps. With these methods, the battery can have a structure in which a part of the sealing member 310 forms a protruding portion protruding toward the solid electrolyte layer 130 or the opening hole 440. However, the method for forming the portion protruding toward the solid electrolyte layer 130 or the opening hole 440 is not limited to these methods.

After the application of the encapsulating material, heat treatment or UV irradiation may be performed. When the encapsulating material contains a thermosetting material or a photocurable material, the viscosity of the coating material can be increased to cure the coating material while the flowability of the coating material is maintained. By increasing the viscosity and curing the coating material in the manner described above, the deformation of the sealing member 310 can be controlled.

Next, a negative electrode material and a solvent are kneaded to prepare a paste-like coating material. This coating material is applied to the negative electrode current collector 210 having the negative electrode opening 410 so as to cover an area spaced outward from the negative electrode opening 410. Specifically, the negative electrode active material layer 110 is formed. Then, the solid electrolyte material is applied to the negative electrode current collector 210 so as to cover an area spaced outward from the negative electrode opening 410 such that the upper surface of the applied negative electrode active material layer 110 and its side surfaces on the negative electrode opening 410 side are covered. Then the solid electrolyte material applied is dried. Specifically, the negative electrode-side solid electrolyte layer 133 is formed. A negative electrode plate having the negative electrode opening 410 is thereby produced. The negative electrode material may also be prepared as a material containing no solvent.

Next, as shown in FIG. 11(c), a pressurizing jig 500 including an upper jig 510 and a lower jig 520 is used to press-bond the negative electrode plate to the positive electrode plate with the positive electrode opening 420 aligned with the negative electrode opening 410. Specifically, the negative electrode opening 410 of the negative electrode plate is disposed so as to face the positive electrode opening 420 of the positive electrode plate having the sealing member 310 formed thereon, and the negative electrode plate and the positive electrode plate are held between the upper jig 510 and the lower jig 520 and press-bonded.

For example, a foaming source that generates a gas when heated may be mixed into the sealing member, and the pressurizing jig may be pre-heated. In this manner, a large number of fine cavities 354 can be produced in the sealing member 310 after joining.

The battery 1800 having the opening hole 440 is thereby produced as shown in FIG. 11(d).

For example, when the encapsulating material contains a thermosetting material or a photocurable material, the sealing member 310 may be subjected to final curing using heat treatment, UV irradiation, etc. In this case, a more firmly encapsulated state can be obtained.

Instead of applying the encapsulating material to the positive electrode current collector 220, the encapsulating material may be applied to the negative electrode current collector 210.

The encapsulating material may be applied to both the negative electrode current collector 210 and the positive electrode current collector 220. Specifically, part of the sealing member 310 may be formed on each of the negative electrode plate and the positive electrode plate, and then the negative electrode plate and the positive electrode plate may be laminated together. In this case, the amount of the sealing member 310 formed at one time is reduced, so that the sealing member 310 can be formed faster. Moreover, since the joint between the negative electrode plate and the sealing member 310 and the joint between the positive electrode plate and the sealing member 310 are formed in a reliable manner, the negative electrode plate and the positive electrode plate can be joined together through the sealing member 310 more firmly. Moreover, since the height of protruding portions of the sealing member 310 is small, the negative electrode plate or the positive electrode plate can be easily wound in the course of the process. When the first material and the second material are used for the negative electrode plate and the positive electrode plate, respectively, different encapsulating materials optimal for the negative and positive electrode plates can be selected.

The negative and positive electrode plates are press-bonded together through the above steps, and the negative electrode current collector 210 and the positive electrode current collector 220 can thereby firmly bonded around the opening hole 440 through the sealing member 310 while a short circuit between the negative electrode current collector 210 and the positive electrode current collector 220 is prevented. When a material having characteristics such as shock resistance and insulating properties superior to the solid electrolyte material is used as the first material contained in the sealing member 310, the shock resistance of the battery when a shock is applied to the opening hole 440 can be improved.

As described above, the method for producing the battery 1800 shown in FIG. 11 includes the step of, before the positive electrode plate and the negative electrode plate are laminated together, forming the sealing member 310. In this manner, the sealing member 310 is formed outside at least one of the negative electrode opening 410 of the negative electrode current collector 210 or the positive electrode opening 420 of the positive electrode current collector 220. The sealing member 310 can thereby be disposed outside the opening hole 440 so as to be located between the positive electrode current collector 220 and the negative electrode current collector 210, so that the risk of a short circuit caused by direct contact between the negative electrode current collector 210 and the positive electrode current collector 220 around the opening hole 440 can be significantly reduced without increasing the thickness of the battery. At the same time, the joint strength between the positive and negative electrode plates around the opening hole 440 can be increased.

The position at which the sealing member 310 is formed, the areas in which the negative electrode active material layer 110, the positive electrode active material layer 120, and the solid electrolyte layer 130 are formed, the sizes of the negative electrode current collector 210 and the positive electrode current collector 220, etc. may be adjusted. In the manner described above, the batteries shown in embodiment 1 and the modifications can be produced. By laminating a plurality of the batteries, laminated batteries shown in embodiment 2 described below can be produced.

The opening hole 440 formed can be used as an observation window. Moreover, for example, an electric wire, an optical cable, etc. may be inserted into the opening hole 440, or the opening hole 440 can be used as a space for fitting or installation of a circuit component or a display and can also be used as a ventilation passage.

Embodiment 2

Embodiment 2 will next be described. In the following description, differences from embodiment 1 and the modifications will be mainly described, and the description of common features will be omitted or simplified. FIGS. 12 to 17 are cross-sectional views showing examples of a schematic structure of a laminated battery including a plurality of batteries connected to each other.

Figure 12:
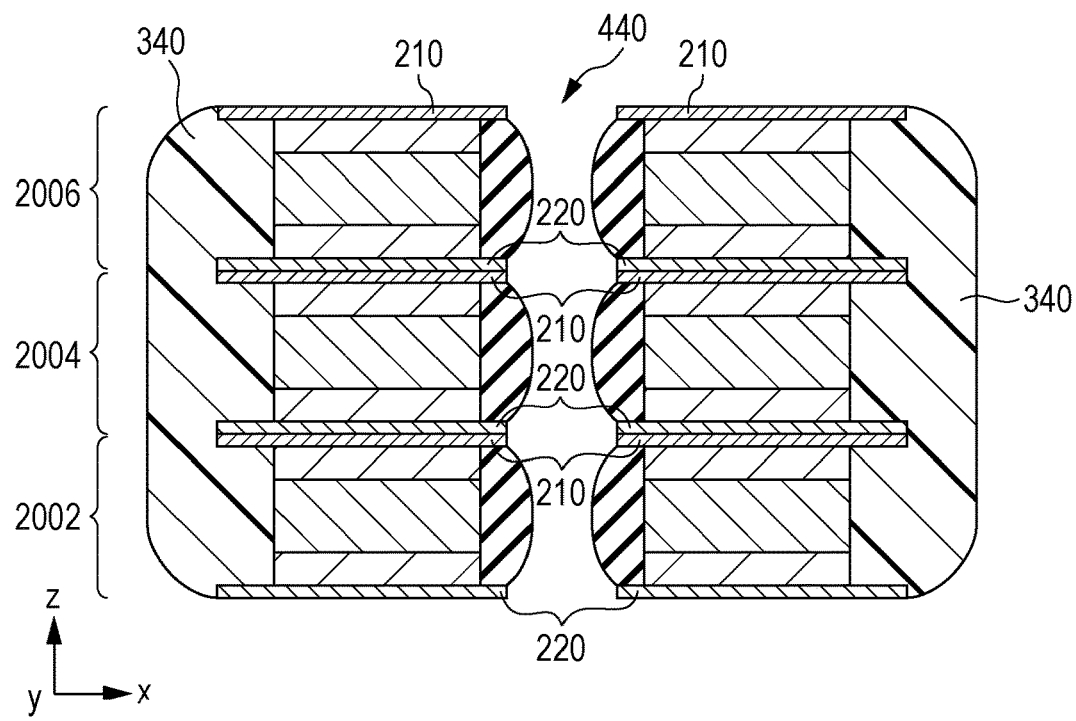
FIG. 12 is an illustration showing an example of a schematic structure of a laminated battery in embodiment 2.
Figure 13:
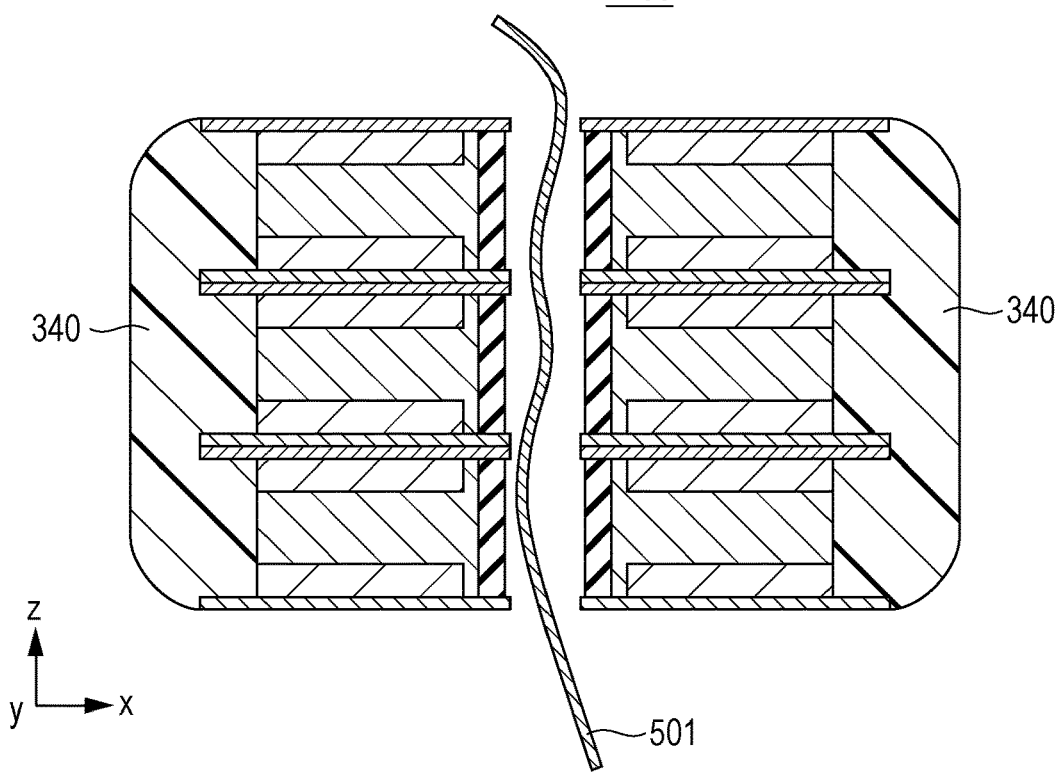
FIG. 13 is an illustration showing another example of the schematic structure of the laminated battery in embodiment 2.

FIG. 12 is a cross-sectional view showing a schematical structure of a laminated battery 2000 in embodiment 2. The laminated battery 2000 in embodiment 2 is obtained by laminating and electrically connecting a plurality of the batteries in any of embodiment 1 and the modifications described above such that the opening holes 440 of the batteries are in communication with each other.

In the example shown in FIG. 12, the laminated battery 2000 has a structure in which three batteries 2002, 2004, and 2006 are laminated in this order such that the laminating positions of the opening holes 440 of the single batteries are aligned to allow the opening holes 440 to be in communication with each other. The batteries 2002, 2004, and 2006 each have the structure of any of the batteries shown in embodiment 1. For example, the batteries 2002, 2004, and 2006 may each have the structure of the battery 1500 in modification 5 of embodiment 1. For example, at least one of the batteries 2002, 2004, and 2006 may be the battery 1000 in embodiment 1 or may be at least one of the batteries 1100 to 1900 in modifications 1 to 9 of embodiment 1.

In the laminated battery 2000, the negative electrode current collector 210 of a given battery (for example, a single battery) is joined to the positive electrode current collector 220 of another battery (for example, another single battery), and the plurality of batteries can thereby be laminated in series. Specifically, as shown in FIG. 12, the vertical orientations of the positive and negative electrodes of the batteries 2002, 2004, and 2006 are the same. The negative electrode current collector 210 of the battery 2002 is joined to the positive electrode current collector 220 of the battery 2004, and the negative electrode current collector 210 of the battery 2004 is joined to the positive electrode current collector 220 of the battery 2006, so that the batteries 2002, 2004, and 2006 are connected in series. The negative electrode current collectors 210 and the respective positive electrode current collectors 220 may be joined directly or may be joined using a conductive adhesive or by welding. A negative electrode current collector 210 and a positive electrode current collector 220 integrated in advance may be used. An external encapsulating material 340 is formed on the outer circumference of the laminated battery 2000. The entire laminated battery 2000 is thereby encapsulated, and the reliability of the laminated battery can be further improved.

The laminated battery 2000 is formed such that the laminating positions of the opening holes 440 of the single batteries are aligned to allow the opening holes 440 to be in communication with each other. Therefore, in the laminated battery 2000, as in the above-described single battery, the opening holes 440 can be utilized.

The opening holes of the plurality of laminated batteries can be used as an observation window. Moreover, for example, the opening holes can be used as a passage for a through component 501 such as an electric wire or an optical cable, as in a laminated battery 2100 shown in a schematic cross section in FIG. 13.

Figure 14:
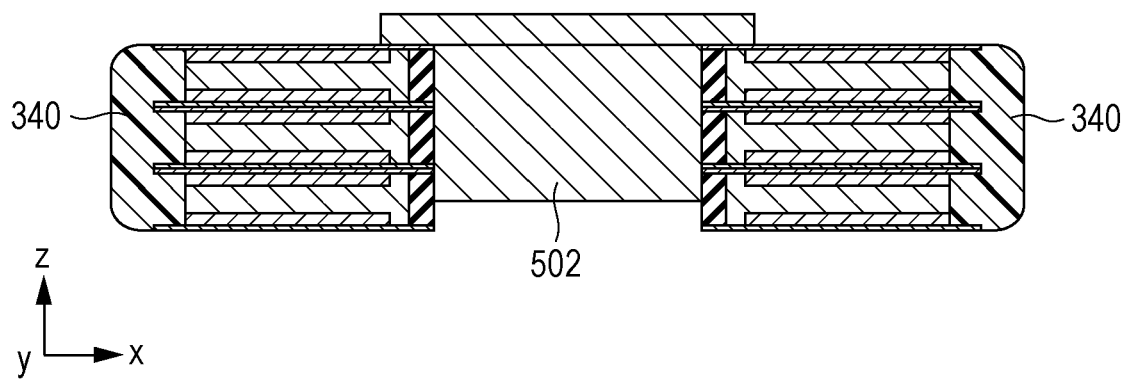
FIG. 14 is an illustration showing another example of the schematic structure of the laminated battery in embodiment 2.

The opening holes of the plurality of laminated batteries can be utilized as, for example, a space for an installation component 502 used for installation of a circuit component, a display, etc., as in a laminated battery 2200 shown in a schematic cross section in FIG. 14.

Figure 15:
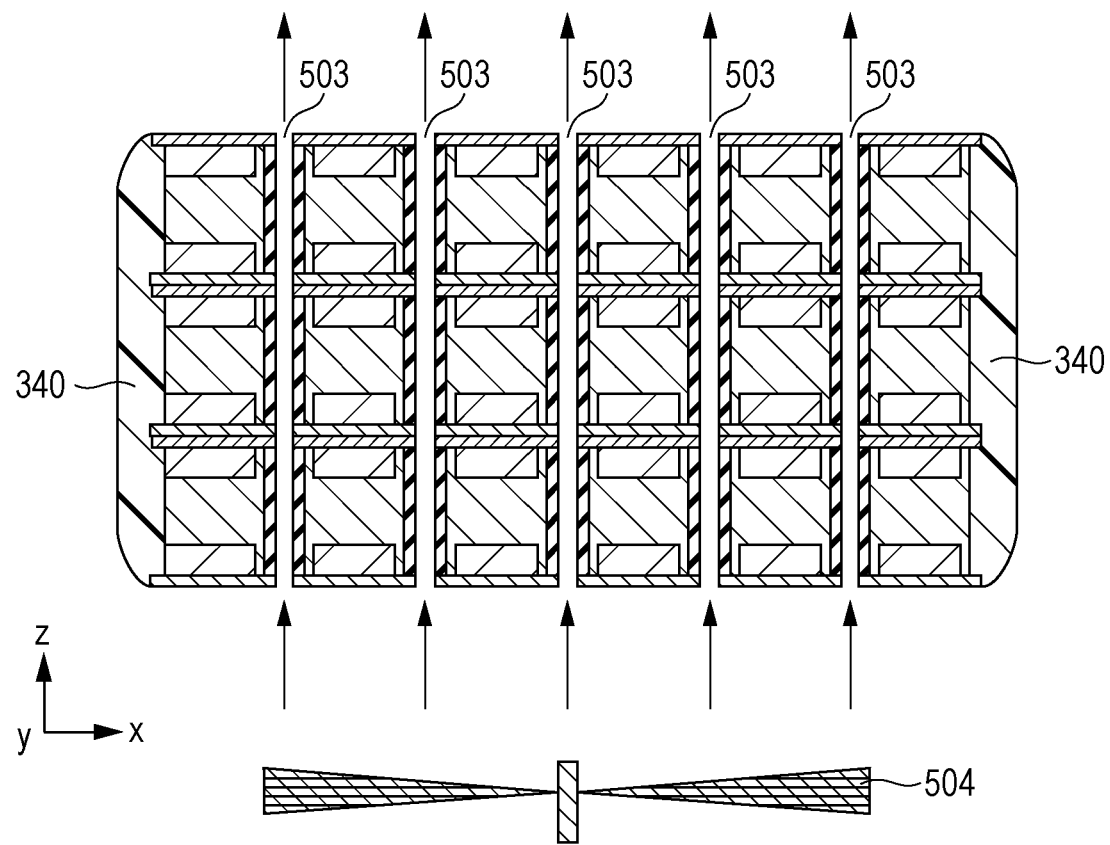
FIG. 15 is an illustration showing another example of the schematic structure of the laminated battery in embodiment 2.

Moreover, a laminated battery 2300 shown in a schematic cross section in FIG. 15 includes a plurality of laminated batteries each having a plurality of opening holes. The opening holes are arranged at prescribed intervals in plan view and can be effectively used as dot-like opening passages 503 for a battery cooling medium. In this case, the battery cooling medium is fed to the opening passages 503 of the laminated battery 2300 using, for example, a cooling device 504. The battery cooling medium may be, for example, a gas or a liquid.

Figure 16:
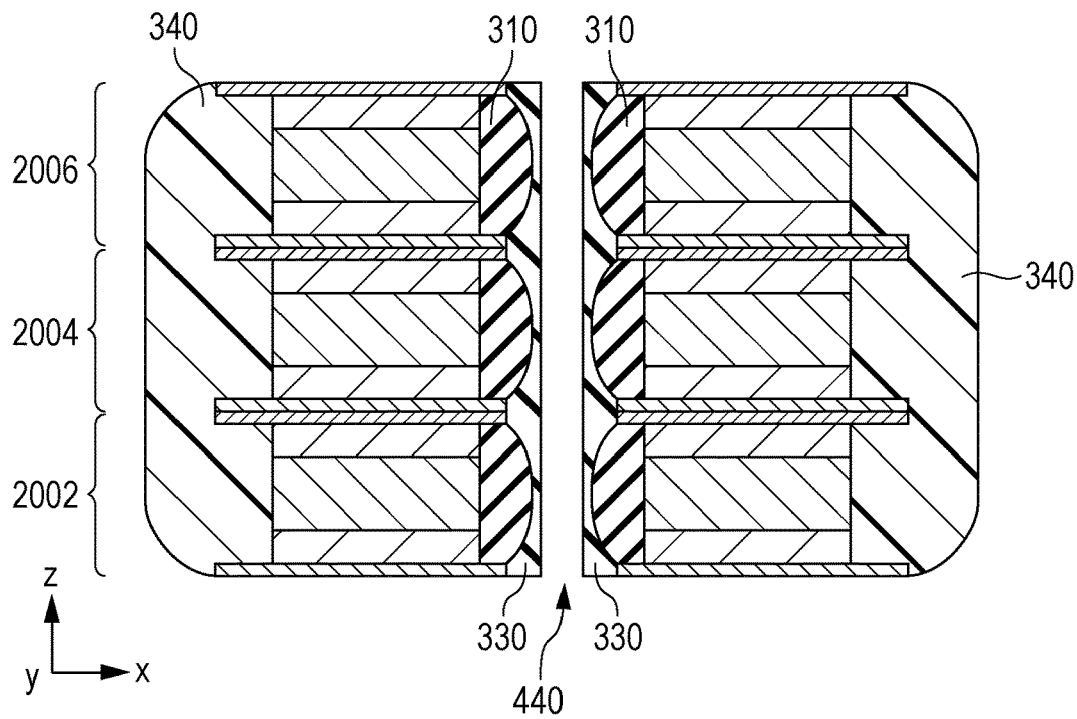
FIG. 16 is an illustration showing another example of the schematic structure of the laminated battery in embodiment 2.

As shown in FIG. 16, a laminated battery 2400 may further include an electrically insulating member 330. The electrically insulating member 330 covers the inner surface of a communicating opening hole formed of the opening holes 440 of the batteries 2002, 2004, and 2006 that are in communication with each other. Specifically, the laminated battery 2400 includes the electrically insulating member 330 that covers the inner surface of the communicating opening hole formed of the opening holes 440 in communication with each other. In this case, the sealing member 310 is disposed around the opening holes 440 and extends between the positive electrode current collector and the negative electrode current collector of each battery. Therefore, the electrically insulating member 330, together with the structure having the effect of increasing the joint strength between the positive and negative electrode current collectors in each opening hole 440 and the effect of preventing a short circuit therebetween, allows the laminating state of the plurality of batteries in the laminated battery 2400 to be more firmly maintained. The electrically insulating member 330 is an example of the coating member.

The number of batteries included in the laminated battery may be three or more and may be only two. By adjusting the number of laminated batteries, desired battery characteristics can be obtained. In embodiment 2, high insulating properties in the opening and high joint strength can be obtained without increasing the thickness of each single battery. Therefore, the advantage that the batteries in the laminated battery are not increased in thickness can be utilized more effectively.

With the above structure, a high voltage can be obtained by laminating a plurality of single batteries in series. Therefore, a series connection-type laminated battery with reduced risk of a short circuit can be obtained. Specifically, a laminated battery having a series-connected bipolar structure with reduced risk of a short circuit due to contact between current collectors can be formed.

Figure 17:
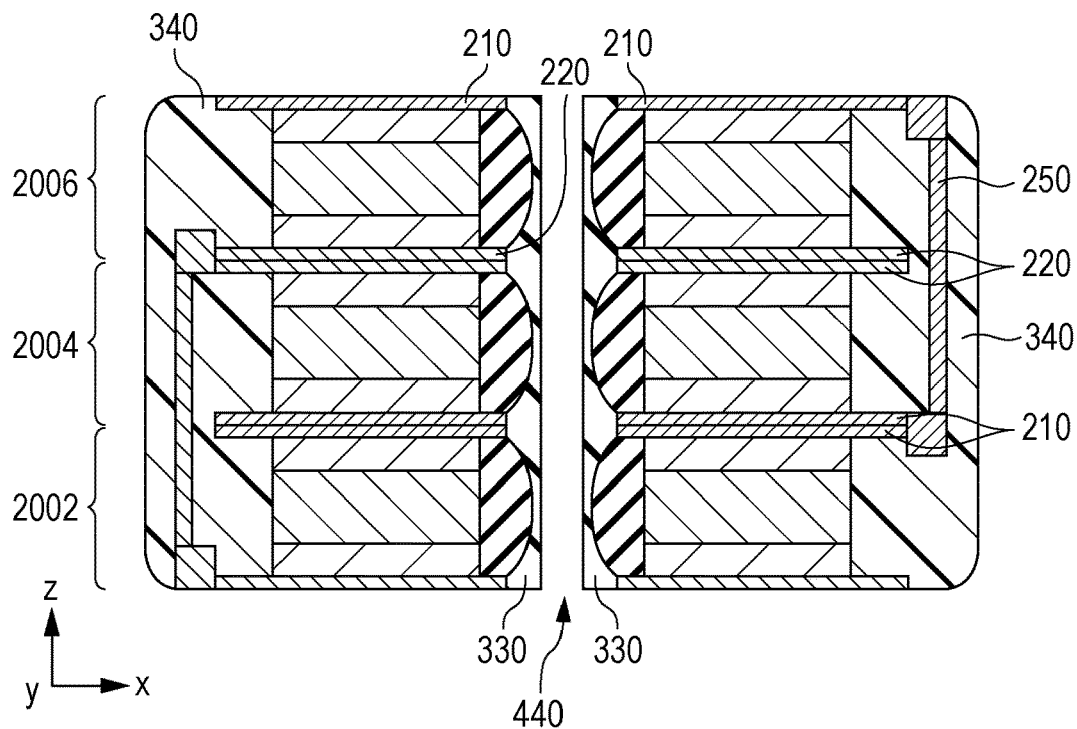
FIG. 17 is an illustration showing another example of the schematic structure of the laminated battery in embodiment 2.

When a laminated battery is formed, a plurality of batteries may be connected in parallel according to the necessary characteristics, as in a laminated battery 2500 shown in FIG. 17. The laminated battery 2500 has a structure in which three batteries 2002, 2004, and 2006 are laminated in this order such that the staking positions of the opening holes 440 of the single batteries are aligned so as to allow the opening holes 440 to be in communication with each other. In FIG. 17, the laminating direction of the battery 2004 is opposite to that in FIG. 16, and the negative electrode current collector 210 of the battery 2002 is joined to the negative electrode current collector 210 of the battery 2004. Moreover, the positive electrode current collector 220 of the battery 2004 is joined to the positive electrode current collector 220 of the battery 2006. The plurality of positive electrode current collectors and the plurality of negative electrode current collectors are connected through respective parallel current collectors 250.

By connecting a plurality of single batteries in parallel, a high-capacity laminated battery can be obtained. Therefore, a parallel-connected laminated battery with reduced risk of a short circuit can be obtained. Specifically, a laminated battery having a parallel-connected laminating structure with reduced risk of a short circuit due to contact between current collectors can be formed.

Batteries included in a laminated battery may be a mixture of two or more batteries connected in parallel and two or more batteries connected in series. In this case, the laminated battery can have a high capacity even though it has a limited volume. The series connection, the parallel connection, or a combination thereof can be easily obtained by changing the method of connecting the current collectors of the plurality of single batteries using a well-known technique.

The laminated battery may be sealed in a sealing case. The sealing case used may be, for example, a lamination bag, a metal can, a resin case, etc. By using the sealing case, deterioration of the power generation element due to moisture can be prevented.

Other Embodiments

One or a plurality of modes of the battery have been described based on the embodiments. However, the present disclosure is not limited to these embodiments. Various modifications to the embodiments that are conceivable by a person of skill in the art and modes obtained by combining components in difference embodiments are also included in the scope of the present disclosure, so long as they do not depart from the spirit of the present disclosure.

Various modifications, replacements, additions, omissions, etc. may be made to the above embodiments within the scope of the claims or equivalents thereof.

For example, in the above embodiments, the number of opening holes formed in each battery is one, but this is not a limitation. The battery may have a plurality of opening holes.

For example, in the above embodiments, the positive electrode current collector is smaller than the negative electrode current collector in plan view, but this is not a limitation. The positive electrode current collector and the negative electrode current collector may have the same area and may be formed so as to fully overlap each other in plan view.

For example, in the above embodiments, the outer circumference of the opening hole is covered in every direction with the sealing member, but this is not a limitation. The outer circumference may not be covered in a certain direction.

The battery of the present disclosure can be used as batteries used for electronic devices, electric devices, electric vehicles, etc.

What is claimed is:

1. A battery comprising:
    a positive electrode current collector;
    a positive electrode active material layer;
    a solid electrolyte layer containing a solid electrolyte;
    a negative electrode active material layer;
    a negative electrode current collector; and
    a sealing member,
    wherein the battery has a structure in which the positive electrode current collector, the positive electrode active material layer, the solid electrolyte layer, the negative electrode active material layer, and the negative electrode current collector are laminated in this order,
    wherein the battery has an opening hole penetrating the positive electrode current collector, the positive electrode active material layer, the solid electrolyte layer, the negative electrode active material layer, and the negative electrode current collector in a laminating direction of the structure,
    wherein each of the negative electrode active material layer and the solid electrolyte layer has a laminating surface intersecting the laminating direction,
    wherein, in cross-sectional view perpendicular to the laminating direction, the sealing member is located between the opening hole and each of the positive electrode active material layer, the solid electrolyte layer, and the negative electrode active material layer, and
    wherein the sealing member is in contact with the positive electrode current collector and the negative electrode current collector and is in contact with a part of the laminating surface of the negative electrode active material layer or a part of the laminating surface of the solid electrolyte layer.

2. The battery according to claim 1, wherein the positive electrode active material layer, the solid electrolyte layer, and the negative electrode active material layer are not exposed in the opening hole.

3. The battery according to claim 1, wherein the sealing member is sandwiched between the positive electrode current collector and the negative electrode current collector.

4. The battery according to claim 1, wherein the sealing member has a shape protruding into the solid electrolyte layer.

5. The battery according to claim 1, wherein the sealing member has a shape protruding toward the opening hole.

6. The battery according to claim 1, wherein the battery has a space inside the sealing member or between the sealing member and at least one of the positive electrode active material layer, the solid electrolyte layer, or the negative electrode active material layer.

7. The battery according to claim 1, wherein an opening hole-side side surface of at least one of the positive electrode active material layer or the negative electrode active material layer is covered with the solid electrolyte layer and is not in contact with the sealing member.

8. The battery according to claim 1, wherein, in plan view, the part of the laminating surface of the negative electrode active material layer is located closer to the opening hole than the solid electrolyte layer, and
    wherein the sealing member is in contact with the part of the laminating surface of the negative electrode active material layer.

9. The battery according to claim 1, wherein the solid electrolyte layer includes:
    a first solid electrolyte layer having the laminating surface; and
    a second solid electrolyte layer that is located closer to the positive electrode active material layer than the first solid electrolyte layer,
    wherein, in plan view, the part of the laminating surface of the first solid electrolyte layer is located closer to the opening hole than the second solid electrolyte layer, and
    wherein the sealing member is in contact with the part of the laminating surface of the first solid electrolyte layer.

10. The battery according to claim 1, wherein the sealing member includes:
    a first sealing member containing a first material; and
    a second sealing member located closer to the positive electrode current collector than the first sealing member and containing a second material different from the first material.

11. The battery according to claim 1, wherein the sealing member contains an insulating material having no ionic conductivity.

12. The battery according to claim 1, wherein the sealing member contains a resin or a sealing material.

13. The battery according to claim 1, wherein the sealing member contains at least one selected from the group consisting of epoxy resins, acrylic resins, polyimide resins, and silsesquioxanes.

14. The battery according to claim 1, wherein the sealing member contains a particulate metal oxide material.

15. The battery according to claim 1, wherein the battery has a plurality of opening holes, and
    wherein the opening hole is one of the plurality of opening holes.

16. A laminated battery comprising:
    a plurality of batteries,
    wherein each of the plurality of batteries is the battery according to claim 1,
    wherein the plurality of batteries are electrically connected in series or parallel and are laminated such that the opening holes of the plurality of batteries are in communication with each other.

17. The laminated battery according to claim 16, further comprising a coating member that covers an inner surface of a communicating opening hole formed of the opening holes of the batteries that are in communication with each other.

18. The battery according to claim 1, wherein the sealing member is in contact with a part of the laminating surface of the solid electrolyte layer.

* * * * *